(12) United States Patent
Taylor et al.

(10) Patent No.: US 8,145,457 B2
(45) Date of Patent: Mar. 27, 2012

(54) METHOD AND APPARATUS FOR MODELING DEFORMATION OF A DEFORMABLE BODY EMBOSSED WITH A STAMP

(75) Inventors: Hayden Kingsley Taylor, Cambridge, MA (US); Duane S. Boning, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 525 days.

(21) Appl. No.: 12/355,608

(22) Filed: Jan. 16, 2009

(65) Prior Publication Data
US 2010/0076590 A1  Mar. 25, 2010

Related U.S. Application Data

(60) Provisional application No. 61/099,170, filed on Sep. 22, 2008.

(51) Int. Cl.
| | |
|---|---|
| *G06F 7/60* | (2006.01) |
| *G06F 17/10* | (2006.01) |
| *G06F 19/00* | (2011.01) |
| *B31F 1/07* | (2006.01) |
| *B31F 1/22* | (2006.01) |
| *B31F 1/32* | (2006.01) |
| *B44C 1/24* | (2006.01) |
| *B44C 3/08* | (2006.01) |
| *B44C 5/04* | (2006.01) |
| *B29C 59/04* | (2006.01) |
| *B29C 35/08* | (2006.01) |
| *B29C 45/76* | (2006.01) |

(52) U.S. Cl. ............... 703/2; 101/32; 156/209; 156/219; 264/40.5; 264/496; 700/206; 700/207

(58) Field of Classification Search ................... 700/206, 700/207; 703/2; 72/48; 101/32; 450.1; 156/209, 156/219; 430/322, 330; 264/40.1, 40.5, 264/405, 406, 494, 496
See application file for complete search history.

(56) References Cited

U.S. PATENT DOCUMENTS

| | | | |
|---|---|---|---|
| 6,096,247 A | 8/2000 | Ulsh et al. | |
| 7,195,733 B2 * | 3/2007 | Rogers et al. | ............... 264/496 |
| 7,388,178 B2 * | 6/2008 | Hennessey | ............... 219/635 |

(Continued)

OTHER PUBLICATIONS

Duffy, D.C., et al., "Rapid Prototyping of Microfluidic Systems in Poly(dimethylsiloxane)," *Anal. Chem.*, 70(23):4974-4984 (1998).

(Continued)

*Primary Examiner* — Crystal J Barnes-Bullock
(74) *Attorney, Agent, or Firm* — Hamilton, Brook, Smith & Reynolds, P.C.

(57) ABSTRACT

Hot embossing may be more advantageous than other polymer microfabrication processes. An example embodiment of the present invention relates to a method and corresponding apparatus for developing a computationally inexpensive viscoelastic model for the hot embossing of complex patterns. These developed models may help engineers refine their selection of processing parameters based upon successive simulations of the embossing process. The example embodiment models deformation of a deformable body embossed with a stamp as a function of convolving a point-load-time response and a contact pressure distribution. In order to generate the point-load-time response, a time-dependent response of a surface of the thermoplastic to system inputs applied to an elemental region of the surface of the thermoplastic may be employed. The example embodiment generates an estimate of the contact pressure distribution as a function of the point-load-time response and an average pressure applied to the stamp.

21 Claims, 27 Drawing Sheets

U.S. PATENT DOCUMENTS

| | | | |
|---|---|---|---|
| 2004/0197712 A1* | 10/2004 | Jacobson et al. | 430/322 |
| 2007/0089495 A1* | 4/2007 | Plona | 73/66 |
| 2008/0000375 A1* | 1/2008 | Nielsen et al. | 101/450.1 |
| 2009/0050487 A1* | 2/2009 | Fang et al. | 205/135 |

OTHER PUBLICATIONS

Huang, C.K., "Polymeric nanofeatures of 100 nm using injection moulding for replication," *J Micromech Microengineering*, 17:1518-1526 (2007).

Mäkelä, T., et al., "Continuous roll to roll nanoimprinting of inherently conducting polyaniline," *Microelectronic Engineering*, 84: 877-879 (2007).

Tan, H., et al., "Roller nanoimprint lithography," *J. Vac. Sci. Technol.*, 16(6):3926-3928 (Nov./Dec. 1998).

Guo, Y., et al., "Study of the demolding process—implications for thermal stress, adhesion and friction control," *J Micromech Microengineering*, 17:9-19 (2007).

Dirckx, M., et al., "High-temperature de-molding for cycle time reduction in hot embossing," *ANTEC*, 2972-2976 (2007).

Rowland, H.D., et al., "Impact of polymer film thickness and cavity size on polymer flow during embossing: Toward process design rules for nanoimprint lithography," *J Micromech Microengineering*, 15:2414-2425 (2005).

Rowland, H.D., et al., "Simulations of nonuniform embossing: The effect of asymmetric neighbor cavities on polymer flow during nanoimprint lithography," *J. Vac. Sci. Technol.* 23(6):2958-2962 (Nov./Dec. 2005).

Hirai, Y., et al., "Simulation and experimental study of polymer deformation in nanoimprint lithography," *J. Vac. Sci. Technol.* 22(6):3288-3293 (Nov./Dec. 2004).

Scheer, H-C., "Polymer time constants during low temperature nanoimprint lithography," *J. Vac. Sci. Technol.*, 23(6):2963-2966 (Nov./Dec. 2005).

Takagi, H., et al., "Analysis of time dependent polymer deformation based on a viscoelastic model in thermal imprint process," *Microelectronic Engineering*, 85:902-906 (2008).

Hirai, Y., et al., "Pressure and resist thickness dependency of resist time evolutions profiles in nanoimprint lithography," *Microelectronic Engineering*, 85:842-845 (2008).

Young, W-B, "Analysis of the nanoimprint lithography with a viscous model," *Microelectronic Engineering*, 77:405-411 (2005).

Juang, Y.J. et al., "Hot embossing in microfabrication. Part II: Rheological characterization and process analysis," *Polym. Eng. Sci.*, 42(3):551-566 (2002).

Worgull, M., et al., "Modeling and optimization of the hot embossing process for micro- and nanocomponent fabrication," *J. Microlith. , Microfab. , Microsyst.*, 5(1):011005-1-011005-13 (Jan.-Mar. 2006).

Lin, C.-R, et al., "The characterisation and finite-element analysis of a polymer under hot pressing," *Int J Adv Manuf Technol*, 20:230-235 (2002).

Arruda, E.M., et al., "Effects of strain rate, temperature and thermomechanical coupling on the finite strain deformation of glassy polymers," *Mech. Mater.*, 19:193-212 (1995).

Ames, Nicoli Margaret, "A Thermo-Mechanical Finite Deformation Theory of Plasticity for Amorphous Polymers: Application to Micro-Hot-Embossing of Poly(Methyl Methacrylate)," Unpublished doctoral dissertation, Massachusetts Institute of Technology, (Jun. 2007).

Sirotkin, V., et al., "Viscous flow simulation in nanoimprint using coarse-grain method," *Microelectronic Engineering*, 83:880-883 (2006).

Sirotkin, V., et al., "Coarse-grain method for modeling of stamp and substrate deformation in nanoimprint," *Microelectronic Engineering*, 84:868-71 (2007).

Sirotkin, V., et al., "Coarse-grain simulation of viscous flow and stamp deformation in nanoimprint," *Journal of Vacuum Science and Technology B: Microelectronics and Nanometer Structures*, 25:2379-2383 (2007).

Kehagias, N., et al., "Residual layer thickness in nanoimprint: experiments and coarse-grain simulation," *Microelectronic Engineering*, 85:846-849 (2008).

Nogi, T., and Kato, T., "Influence of a hard surface layer on the limit of elastic contact—Part I: Analysis using a real surface model," *Journal of Tribology, Transactions of the ASME*, 119:493-500 (1997).

Wang, F. and Keer, L.M., "Numerical simulation for three dimensional elastic-plastic contact with hardening behavior," *Transactions of the ASME. Journal of Tribology*, 127:494-502, 07 (2005).

Peng, W. and Bhushan, B., "A numerical three-dimensional model for the contact of layered elastic/plastic solids with rough surfaces by a variational principle," *Journal of Tribology*, 123:330-342 (2001).

Cai, S. and Bhushan, B., "A numerical three-dimensional contact model for rough, multilayered elastic/plastic solid surfaces," *Wear*, 259:1408-1423 (2005).

Polonsky, I.A. and Keer, L.M., "Fast methods for solving rough contact problems: a comparative study," *Transactions of the ASME. Journal of Tribology*, 122:36-41 (2000).

Polonsky, I.A. and Keer, L.M., "A numerical method for solving rough contact problems based on the multi-level multi-summation and conjugate gradient techniques," *Wear*, 231:206-19 (1999).

Lei, K.F., et al., "Effects of contact-stress on hot-embossed PMMA microchannel wall profile," *Microsystem Tecnologies*, 11:353-357 (2005).

Xie, Xiaolin, "Physical Understanding and Modeling of Chemical Mechanical Planarization in Dielectric Materials," Unpublished doctoral dissertation, Massachusetts Institute of Technology (Jun. 2007).

Williams, M.L., et al., "The temperature dependence of relaxation mechanisms in amorphous polymers and other glass-forming liquids," *J. Am. Chem. Soc.*, 77:3701-3707 (1955).

Dirckx, Matthew E., "Design of a fast cycle time hot micro-embossing machine," Unpublished master's thesis, Massachusetts Institute of Technology, Cambridge, Massachusetts (Jun. 2005).

Taylor, H., et al., "Computationally efficient modelling of pattern dependencies in the micro-embossing of thermoplastic polymers," *Microelectronic Engineering*, 85:1453-1456 (2008).

* cited by examiner

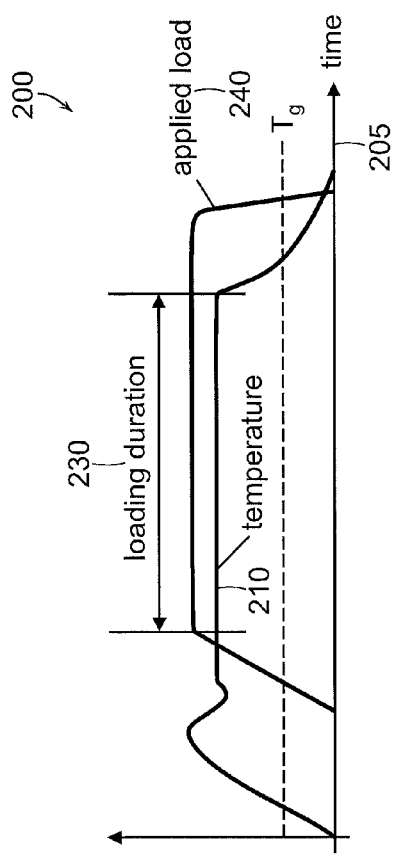
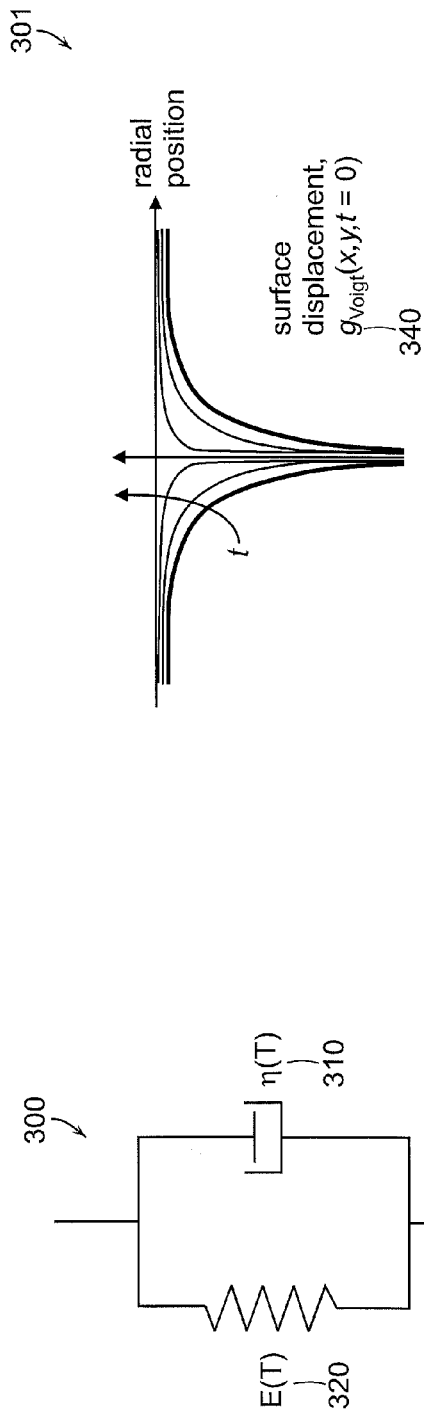

| | Lines/trenches | Square holes |
|---|---|---|
| $V_{T0}$ | 0.80 | 0.68 |
| $V_{F0}$ | 0.95 | 0.95 |
| $P_{F0}$ | 3.0 | 3.0 |

| Loading duration (min) | Polymethylmethacrylate (PMMA) Embossing temperature (°C) | | | | | | | | | |
|---|---|---|---|---|---|---|---|---|---|---|
| | 110 | | 115 | | 117 | | 130 | | 140 | |
| | Po | seq | Po | seq | Po | seq | Po | seq | Po | seq |
| 0 | 4.0<br>8.0 | 1<br>38 | 1.0 | 10 | | | 0.5 | 17 | 0.5 | 6, 26 |
| 1 | 8.0 | 35 | | | | | | | | |
| 2 | 2.0<br>8.0 | 42<br>36 | 1.0 | 28, 31 | 0.5 | 4, 20 | 0.5<br>0.75<br>1.0<br>1.5 | 9, 32<br>12, 25<br>3, 15<br>16, 18 | 0.5 | 27, 30 |
| 3 | 2.0<br>8.0 | 40<br>33 | | | | | | | | |
| 4 | 2.0<br>8.0 | 43<br>37 | | | | | | | | |
| 5 | 2.0<br>4.0<br>8.0 | 41<br>2<br>34 | 1.0 | 13, 23 | 0.5 | 19, 22 | 0.5 | 8, 24 | 0.5 | 5, 21 |
| 30 | 2.0<br>8.0 | 44<br>39 | 1.0 | 7, 11 | 0.5 | 14, 29 | | | | |

| Loading duration (min) | Polycarbonate (PC) Embossing temperature (°C) | | | | | | | |
|---|---|---|---|---|---|---|---|---|
| | 140 | | 145 | | 150 | | 155 | |
| | Po | seq | Po | seq | Po | seq | Po | seq |
| 2 | 2.0<br>4.0<br>8.0<br>10.0 | 12<br>6<br>13<br>14 | 1.0<br>2.0<br>2.5 | 15<br>16<br>17 | 0.5 | 1 | 0.5<br>1.0<br>2.0<br>2.5 | 7<br>8<br>10<br>4 |
| 5 | 2.0 | 11 | 0.5 | 5 | 0.5 | 9 | 0.5 | 3 |
| 30 | 2.0 | 20 | 0.5 | 2 | 0.5 | 19 | 0.5 | 18 |

| Loading duration (min) | Zeonor 1060R Embossing temperature (°C) | | | | | | | |
|---|---|---|---|---|---|---|---|---|
| | 100 | | 105 | | 110 | | 120 | |
| | Po | seq | Po | seq | Po | seq | Po | seq |
| 2 | 1.0<br>2.0<br>4.0<br>5.0 | 5<br>1<br>8<br>10 | 0.14<br>2.0 | 6 | 0.14 | 15 | 0.14<br>0.30<br>0.54<br>0.70 | 2<br>7<br>9<br>11 |
| 5 | 1.0<br>2.0 | 13<br>4 | 0.14 | 14 | 0.14 | 12 | 0.14 | 3 |
| 30 | 1.0 | 16 | 5.0 | 19 | 0.14 | 17 | 0.14 | 18 |

FIG. 16b

| Parameter | PMMA | PC | Zeonor 1060R |
|---|---|---|---|
| $E_g$ (M.Pa) | 4.1 | 9.0 | 2.5 |
| $E_r$ (M.Pa) | 1.9 | 0.0 | 0.0 |
| $\Delta T$ (K) | 8.5 | 13.9 | 12.0 |
| $\eta_0$ (Pa.s) | $9.9 \cdot 10^{11}$ | $1.5 \cdot 10^{10}$ | $5.9 \cdot 10^{12}$ |
| $c_1$ | 12.5 | 6.5 | 6.0 |
| $c_2$ (K) | 4.4 | 11.2 | 30.0 |
| $T_g$ (K) | 380 | 414 | 377 |
| r.m.s. fitting error (μm) | 1.34 | 1.20 | 1.73 |

| Simulation approach | No cavity tops touched | Cavity tops touched |
|---|---|---|
| Flat N=800 | 79 s | 750 s * |
| Hierarchical, N=8 | 4.3 s | 9.2 s |
| Hierarchical, N=64 | 5.1 s | 27.6 s * |

METHOD AND APPARATUS FOR MODELING DEFORMATION OF A DEFORMABLE BODY EMBOSSED WITH A STAMP

RELATED APPLICATION(S)

This application claims the benefit of U.S. Provisional Application No. 61/099,170, filed on Sep. 22, 2008, and 61/121,020, filed Dec. 9, 2008.

The entire teachings of the above application are incorporated herein by reference.

BACKGROUND OF THE INVENTION

The hot embossing of thermoplastic polymers has attracted attention as a promising microfabrication process. Hot embossing has certain advantages over other polymer microfabrication processes. The micro-casting of curable liquid resins, which is a process that is used with elastomers such as polydimethylsiloxane (PDMS), is widely known as soft lithography (1) and is ideal for prototyping small numbers of devices. Unfortunately, considerable manual skill is required to handle the highly flexible components produced.

Available techniques for automating soft lithography have so far proved largely elusive. One example of such methods is injection molding. Injection molding may be used to form microscopic features (2) and can easily be automated, but tooling and equipment costs associated with this method are relatively high.

Finite-element numerical modeling of thermoplastic embossing has also received attention in the art. For example, patterning of sub-micrometer-thickness polymeric layers, as encountered in nano-imprint lithography, has been considered (8-14). The embossed material has variously been described using models such as Newtonian liquid (8, 9, 14), shear-thinning liquid (8, 15), linear-elastic (11), Mooney-Rivlin rubber-elastic model (10, 16), and linear (12, 13) or non-linear (17, 18) visco-elastic models. Other thermomechanically-coupled finite-deformation material models have also been developed (19, 20) and applied to simulate the micro-embossing of bulk polymeric substrates (20). However, finite-element approaches, although capable of capturing many of the physical phenomena observed, are currently too computationally costly to extend to the feature-rich patterns of complete devices.

For the simulation of nanoimprint lithography, Zaitsev, et al. (22) have proposed a simplified "coarse-grain" approach in which the imprinted polymeric layer is modeled as a Newtonian fluid and the pattern of the stamp is represented by a matrix of cells, where each is assumed to contain features of a single size and packing density (21-25).

Efficient numerical simulations of the deformations of elastic (26, 27) and elastic-plastic (28-30) bodies, which may be rough and/or multi-layered (26, 29, 30), have also been considered in tribology. These simulations, in the elastic-plastic cases, rely on a description of the deformation of the material's surface in response to a point-load together with a criterion for yielding of the material. The overall topography of the material's surface is calculated by spatially convolving an iteratively-found contact pressure distribution with the point-load response. Sub-surface stresses can similarly be estimated by convolving contact pressures with appropriate kernel functions (27). The convolution itself may be effected using fast Fourier transforms (26, 28, 29) or other summation methods (31, 32). The solution for the contact-pressure distribution may successfully be obtained using iterative conjugate-gradient methods combined with kinematic constraints on the surface deformation (26, 28, 32) or by using methods that seek a minimum of elastic potential energy in the layer (29).

The validity of these contact mechanics-based approaches is limited to cases where surface curvatures remain small and all deflections are a small proportion of any layer's thickness. These linear methods have nevertheless proved to be of great value because of the fast computation that is possible. Lei, et al. suggest using such an approach to represent the micro-embossing of thick, rubbery polymeric layers (33). They develop an approximate analytical expression for the shape of the deformed surface of such a layer when embossed with a simple trench, and show rough agreement between that expression and the measured topography of polymethylmethacrylate layers embossed under a small set of processing conditions.

SUMMARY OF THE INVENTION

An example embodiment of the present invention relates to a method and corresponding apparatus for developing an approximate and highly computationally inexpensive viscoelastic model for the hot embossing of patterns. These developed models may help engineers refine their selection of processing parameters based upon successive simulations of the embossing process. They may also help device designers improve the designs of embossed patterns. An example of such improvements in designs of embossed patterns includes enlarging some of the smallest cavities on a stamp to ensure their complete penetration by the polymeric material.

The example embodiment may model deformation of a deformable body embossed with a stamp as a function of convolving a point-load-time response and a contact pressure distribution. In order to generate the point-load-time response, the example embodiment may employ a time-dependent response of a surface of the thermoplastic to system inputs applied to an elemental region of the surface of the thermoplastic. The example embodiment may also generate an estimate of the contact pressure distribution as a function of the point-load-time response and an average pressure applied to the stamp. The example embodiment may also generate the contact pressure distribution as a function of determining a distribution at which the stamp remains rigid while the thermoplastic deforms.

Another example embodiment of the present invention relates to a method and corresponding apparatus for modeling deformation of a deformable body embossed with a stamp. The example embodiment models the deformation as a function of convolving a point-load-time response and a contact pressure distribution and reports the deformation model for use in embossing of the deformable body.

Yet, another example of the present invention relates to a method and corresponding apparatus for determining a displacement of material in a embossed substrate. The example embodiment generates a point-load-time response as a function of determining a time-dependent response of a surface of the substrate to system inputs applied to an elemental region of the surface of the substrate. The example embodiment determines the displacement of the material in the embossed substrate as a function of the point-load-time response and a material spread function.

Another example embodiment of the present invention relates to a method and corresponding apparatus for determining a displacement of a material in a thermoplastic embossed with a stamp. The example embodiment determines one or more properties of the thermoplastic and generates a point-load-time response as a function of determining a time-dependent response of a surface of the thermoplastic to system inputs applied to an elemental region of the surface of the thermoplastic. The example embodiment generates an estimate of the contact pressure distribution as a function of the point-load-time response and an average pressure applied to the stamp and determines the displacement of the material in the thermoplastic as a function of the point-load-time response, the contact pressure distribution, and the one or more time dependent properties of the thermoplastic.

The properties of the thermoplastic may include time dependent properties, temperature dependent properties, temperature and time dependent properties, temperature dependent elasticity of the thermoplastic, or temperature dependent viscosity of the thermoplastic. The example embodiment may also calculate the point-load-time response based on a distance from a loading position.

Another example embodiment of the present invention relates to a method and corresponding apparatus for modeling deformation of a thermoplastic embossed with a stamp. The example embodiment may employ features such as viscosity, elasticity, and a point-load-time response of the thermoplastic to model the deformation of the thermoplastic. The example embodiment reports the deformation model for use in embossing of the deformable body.

Another example embodiment of the present invention relates to a method and a corresponding apparatus for embossing a deformable body with a stamp. The example embodiment deforms the deformable body as a function of applying a test stamp to the deformable body and determines topography of the deformed body (after the test stamp has deformed the deformable body). The example embodiment models quantitative properties of the deformed body as a function of the topography and reports the quantitative properties of the deformed body for use in embossing of the deformable body. The example embodiment may model the quantitative properties of the deformed body as a function of small scale (such as micro-scale or nano-scale) topography of the deformed deformable body. The quantitative properties of the deformed body may include viscosity and/or elasticity.

The test stamp may be periodic in space, include a quasi-periodic pattern or identical patterned regions containing patchwork of features. Each patchwork of features may uniformly patterned with rectangular trenches and square holes.

The example embodiment may employ the quantitative properties to design a stamp used for embossing the deformable body. The example embodiment may emboss the deformable body as a function of the quantitative properties.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a plot that illustrates a relationship between time, temperature, loading duration, and applied load in hot embossing of thermoplastic polymers.

FIG. 3a is an example of a Kelvin-Voigt linear viscoelastic model of the embossed polymeric layer that may be employed by an example embodiment of the present invention.

FIG. 3b includes a series of plots that may be used by an example embodiment of the present invention to determine the response of a deformable body to an impulse applied normally to the surface at a single point and at time t=0.

FIG. 10a includes plots that illustrate the relationship between proportion of the total cavity volume of the stamp that is occupied by polymer and non-dimensional pressure.

FIG. 10b includes a table that illustrates the abstraction parameters for hierarchical simulation of trenches and holes shown in FIG. 10a.

FIG. 16b is a table that includes the embossing conditions and experimental sequence used for each polymeric material.

DETAILED DESCRIPTION OF THE INVENTION

A description of example embodiments of the invention follows.

A method or corresponding apparatus in an example embodiment of the present invention relates to modeling polymeric layers that are substantially thicker than the dimensions of the features being embossed and whose average molecular weight is high enough that at typical embossing temperatures the material is visco-elastic and not describable as Newtonian.

Another example embodiment of the present invention relates to modeling the embossing of finite-thickness thermoplastic layers in a rubbery regime. Thermoplastic polymeric materials used in microfabrication are usually of a sufficiently large average of molecular weight and processed sufficiently far below their melting temperature that their behavior, when embossed, can be adequately described as rubbery. Thus, when compressed with a patterned stamp, the thermoplastic layer rapidly approaches a limiting topography governed by the elastic component of the material's behavior.

Figure 1:
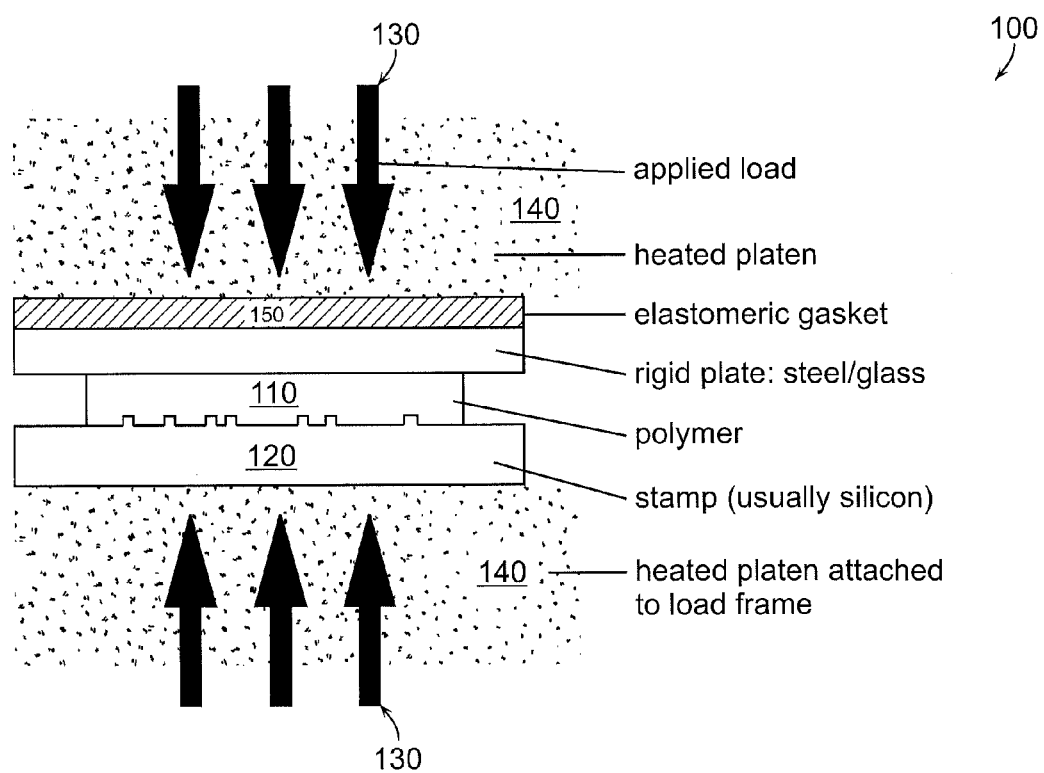
FIG. 1 illustrates an example of hot embossing of a deformable body.

FIG. 1 illustrates an example 100 of hot embossing of a deformable body such as a thermoplastic polymer 110. In hot embossing, a deformable body (e.g., polymer) 110 is heated until it softens, and a hard, reusable, patterned stamp 120 is then pressed into the polymer 110 before both the stamp 120 and the polymer 110 are cooled and then separated. The heating of the polymer 110 may be performed using a heated platen 140 or using any other available technique in the art. The deformable body 110 may be heated above its glass-transition temperature and an embossing load 130 may be applied in order to transfer a microstructure from the stamp 120 to the softened polymer 110. An elastometric gasket 150 may be employed on the flat side of the polymer 110 to ensure that the applied load is distributed adequately and uniformly across the flat side of the polymer even if the heated platens are not perfectly parallel. The polymer 110 may then be cooled to below its glass-transition temperature and the load 130 may be removed and separated from the stamp 120.

The polymer 110 may alternatively be patterned on both sides by inserting a second patterned stamp between the polymer 110 and the rigid plate. Alternatively, the rigid plate could be replaced by a second patterned stamp. Any such second stamp may carry the same pattern as stamp 120, or alternatively a different pattern.

Hot embossing combines moderate cost with ease of automation and may help bridge the gap between the invention and the commercialization of a number of micro and nanofluidic devices and other micro- and nano-devices. Substrates processed by hot embossing may range in size from a single chip to a continuous roll of material (3-5). These features may make hot embossing both amenable to prototyping and potentially more cost-efficient than techniques such as injection molding for very high-volume manufacturing.

Hot embossing for the fabrication of microelectromechanical systems (MEMS) or microfluidics is usually performed on homogeneous polymeric sheets that are much thicker than the characteristic feature sizes of the patterns being embossed. These embossed layers constitute the body of the device being manufactured.

FIG. 2 is a plot 200 that illustrates a relationship between time 205, temperature 210, loading duration 230, and applied load 240 in hot embossing of thermoplastic polymers, according to an example embodiment of the present invention. A pattern to be hot embossed may contain thousands of features ranging from less than a micron to several millimeters in diameter. An embossing temperature 210, load 220, and loading duration 230 must be selected such that every cavity on the stamp is filled with polymer as required. Other constraints on the maximum load 240 and temperature 210 may also be applied. For example, factors such as design of the embossing apparatus or an embosser, desire to restrict differential thermal contraction of stamp and substrate (6-7), or possibility of substrate degradation at very high temperatures may be included as limiting factors on the maximum load and temperature.

The loading duration 230 may be constrained by a desire to maximize throughput. One example embodiment of the present invention may obtain the processing parameters for modeling the displacement caused by embossing (i.e., temperature 210, loading duration 230, and applied load 240) by modeling the mechanical properties of the polymer and conducting a numerical simulation of the embossing process (assuming a set of candidate parameters).

Use of the Material's Point Load-Time Response

FIG. 3a is an example of a Kelvin-Voigt linear viscoelastic model of the embossed polymeric layer 300 that may be employed in an example embodiment of the present invention. The example embodiment employs the linear Kelvin-Voigt model 300 to capture the rubbery behavior of the deformable bodies. The Kelvin-Voigt linear viscoelastic model 300 encapsulates the broad idea that, upon loading, the polymer network of the material deforms over time and approaches a limiting configuration determined by the network's elastic modulus 320 (denoted by E(T)). The viscosity 310, (denoted by η(T)), represents intermolecular resistance to flow. Both the viscosity and the elastic modulus 320, of this model are decreasing functions of temperature, T, with the viscosity 310 in particular exhibiting a change of several orders of magnitude in the vicinity of the glass-transition temperature ($T_g$). This model considers the possibility of slipping of the polymer chain entanglements and a resulting irreversible deformation of the material beyond the configuration implied by the modulus E 320 to be small.

Hot micro-embossing, for a number of thermoplastics, may successfully be performed in a range of temperatures from the glass-transition to several tens of degrees above the material's glass-transition temperature. This is a temperature range which, for PMMA at least, includes a set of temperatures in which the material is well described as "rubbery" (20). In a Kelvin-Voigt linear-viscoelastic representation of a rubbery polymer, the intermolecular resistance to flow (i.e., viscosity) is very small in relation to the elasticity, so that the time taken for the embossed material to approach its limiting topography is likely to be small in comparison with typical loading durations for hot embossing. In other words, the material, when loaded, quickly adopts the deformed shape that is governed by its elastic properties. For embossing in a rubbery regime, the viscous component carries a substantial amount of stress only after the material is cooled under load when its flow-resistance increases by several orders of magnitude resulting in "freezing" the deformation in place as desired.

FIG. 3b includes a series of plots 301 that may be used by an example embodiment of the present invention to determine the response of a deformable body to an impulse applied to the surface of the deformable body at a single point and at time t=0. The example embodiment models of deformation of a deformable body based on a description of the embossed layer's temporal response to a mechanical impulse imparted normal to the layer's surface at a single point. If the material is indeed rubbery, it may be satisfactorily modeled during loading by using its elastic properties alone. The embossed substrate is modeled as an elastic half-space whose undeformed surface resides in the x-y plane and whose deformed surface 340 in response to an impulse of unit magnitude applied at (x=0, y=0, t=0) is:

$$g_{elastic}(x, y, t) = \frac{(1 - v^2)\delta(t)}{\pi E \sqrt{x^2 + y^2}} \tag{1}$$

In the above equation, $\delta(t)$ is the Dirac delta function and $v$ is Poisson's ratio.

The response times of thermoplastic materials in the vicinity of the glass-transition temperature, $T_g$, become substantially larger. Thus, embossing near the glass-transition temperature is likely to require longer loading durations and/or larger applied loads than embossing at temperatures well above the glass-transition. However, it can be advantageous to perform hot embossing at temperatures at or near the glass-transition temperature because such an approach may result one or more of the following: (i) conserve heat energy; (ii) reduce processing time; (iii) reduce damage to stamp and/or polymer arising from differential thermal expansion and contraction of the stamp and the polymer. Therefore, there are merits in embossing as close to the glass-transition temperature as possible.

Another example embodiment of the present invention considers the change in the material's point impulse response $g_{elastic}(x, y, t)$ when its viscous component $\eta(T)$, becomes relevant.

Considering the continuous application (from t=0 to ∞) of a constant normal load at a single point on the surface of the material, the stress distribution in the material does not change with time and does not depend on the relative magnitudes of elasticity and viscosity (provided that the material is linear viscoelastic and neglecting inertial effects in the material). The shape of the deformed surface therefore simply scales over time, beginning as a flat surface at t=0 and approaching for t=∞, a topography is determined only by the material's elasticity. Therefore, the response of a Kelvin-Voigt material to this step point-load is:

$$s_{Voigt}(x, y, t) = \frac{(1 - v^2)\left[1 - \exp\left(\frac{-Et}{\eta}\right)\right]}{\pi E \sqrt{x^2 + y^2}} \tag{2}$$

Via differentiation with respect to time, it follows that the impulse, or 'point-load-time', response of the material layer is:

$$g_{Voigt}(x, y, t) = \frac{(1 - v^2)\exp\left(\frac{-Et}{\eta}\right)}{\pi \eta \sqrt{x^2 + y^2}} \tag{3}$$

Note that in the above relationship, the response of the material layer is now described as a function of its viscosity $\eta(T)$ as well as a function of its elasticity $E(T)$. Assuming small deflections of the surface, and neglecting any tractions applied parallel to the surface of the polymer, the topography $w(x, y, t)$ of the embossed viscoelastic layer can be described as the convolution of the evolving contact pressure distribution $p(x, y, t)$ with the point-load-time response:

$$w(x, y, t) = \tag{4}$$
$$\frac{(1 - v^2)}{\pi \eta} \int_0^t \int_{-\infty}^{\infty} \int_{-\infty}^{\infty} \frac{p(x', y', t')\exp\left(\frac{-E}{\eta}(t - t')\right)}{\sqrt{(x - x')^2 + (y - y')^2}} dx' dy' dt'$$

In hot embossing, this topography is assumed to be "frozen" in place by subsequent cooling of the material while still under load.

Various methods available in the art may be used to calculate the contact pressure distribution and thereby evaluate the embossed topography. Since the complex designs of embossing stamps are likely to be difficult to describe with continuous functions, discrete or numerical solution approaches are expected to be the more appropriate. For example, the embossing process may be broken into a series of time-slices, and the evolving pressure distribution and topography be found for each slice. In this way, as cavities in an embossing stamp begin to be filled with the polymer, the portion of the stamp in contact with the polymer can be tracked.

The Use of a Scaled Contact-Pressure Spatial-Average

Figure 4:
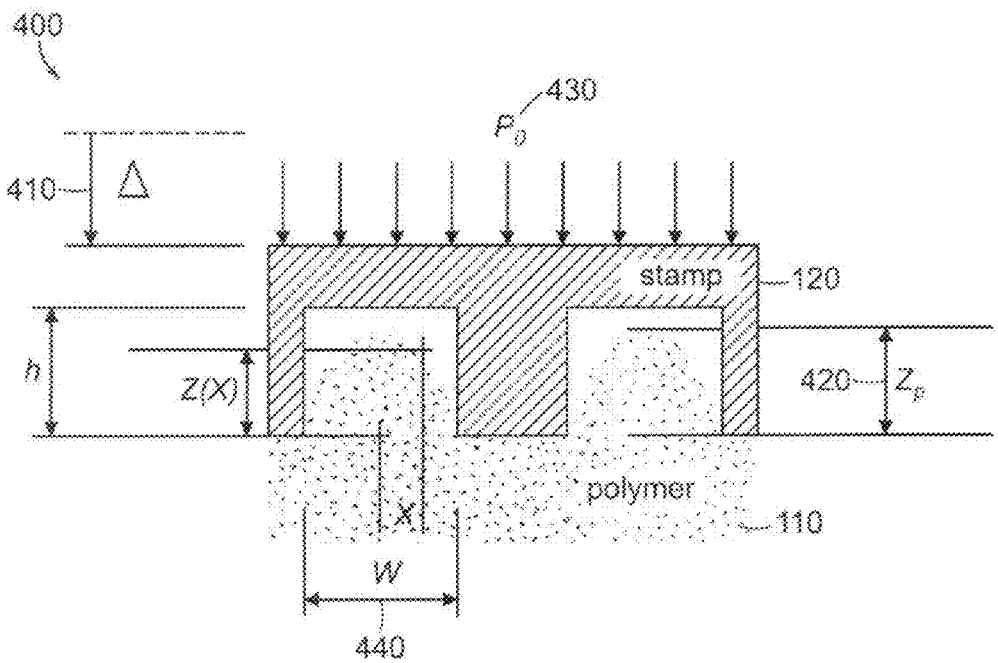
FIG. 4 is an illustration of the cavity nomenclature, including stamp displacement and peak cavity penetration according to an example embodiment of the present invention.

FIG. 4 is an illustration 400 of a cavity nomenclature, including stamp displacement 410 (denoted by $\Delta$) and peak cavity penetration 420 (denoted by $z_p$) according to an example embodiment of the present invention.

The example embodiment defines and employs a new pressure variable, $p_s(x, y, t)$ (not shown), which is an exponentially-weighted average of the true pressure 430 distributions (denoted by $p_0$) over the embossing period 0 to t:

$$p_s(x, y, t) = \frac{E}{\eta} \int_0^t p(x, y, t')\exp\left(\frac{-E}{\eta}(t - t')\right)dt' \tag{5}$$

Assuming that the spatial average of the applied pressure $p(x, y, t)$ is known, as a function $p_0(t)$ 430, the pressure variable $p_s(x, y, t)$ may be integrated over a whole spatial period in x and y to obtain the spatial average of $p_s(x, y, t)$, denoted by $p_{s,0}(t)$ 430-v, shown later in FIG. 5b:

$$p_{s,0}(t) = \frac{E}{\eta} \int_0^t \frac{1}{d^2} \int_0^d \int_0^d p(x, y, t') dx dy \exp\left(\frac{-E}{\eta}(t-t')\right) dt' \quad (6)$$

$$= \frac{E}{\eta} \int_0^t p_0(t') \exp\left(\frac{-E}{\eta}(t-t')\right) dt'$$

The above formula may be rewritten in terms of $p_s(x, y, t)$ to obtain the topography 440 (denoted by $w(x, y, t)$):

$$w(x, y, t) = \frac{1-\nu^2}{\pi E} \int_{-\infty}^{\infty} \int_{-\infty}^{\infty} \frac{p_s(x, y, t)}{\sqrt{(x-x')^2 + (y-y')^2}} dx' dy' \quad (7)$$

The above Equation also describes the topography 440 of a simple linear-elastic layer with a Young's modulus E and exposed instantaneously to the pressure distribution $p_s(x, y, t)$ having the spatial average $p_{s,0}(t)$. The topography 440 of the viscoelastic layer at time t can be modeled by performing a simulation for an elastic layer subjected to an appropriately scaled spatial pressure average.

Figure 5:
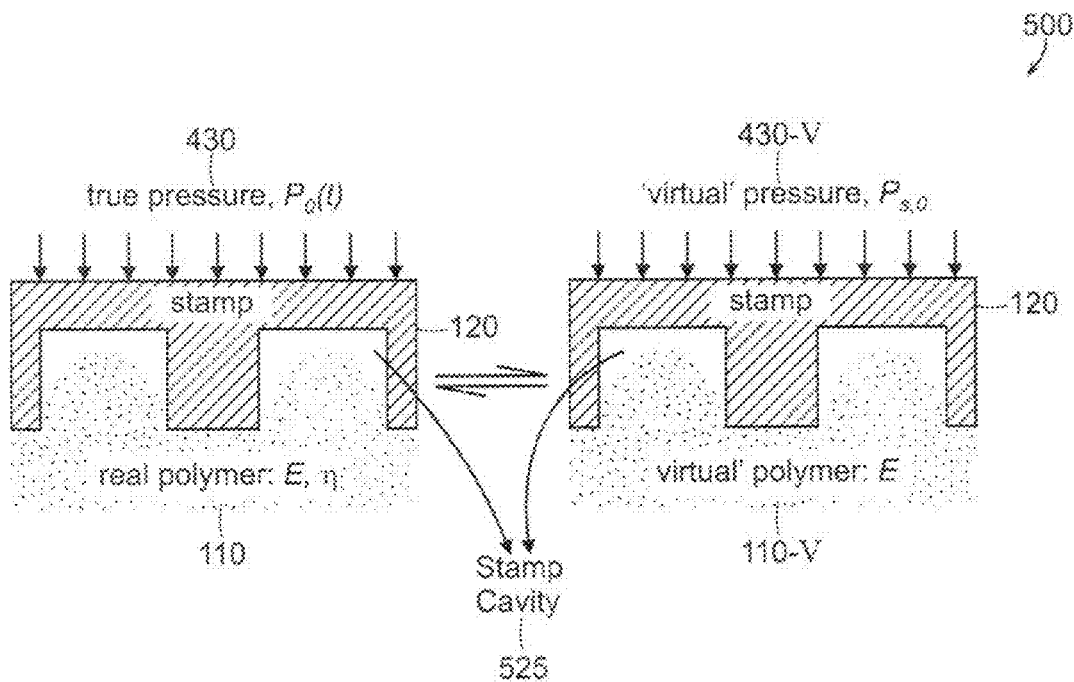
FIG. 5 illustrates an equivalence between a real viscoelastic case and a virtual equivalent simulation performed for a modified stamp-average pressure and a purely elastic substrate.

FIG. 5 is an illustration 500 of the equivalence between a "real" visco-elastic case and a "virtual" equivalent simulation performed for a modified stamp-average pressure $p_{s,0}$ 430-v and a purely elastic substrate 110, according to an example embodiment of the present invention. The example embodiment defines and employs a virtual pressure variable, $p_{s,0}$ 430-v, which is an exponentially-weighted average of the true pressure distributions 430 (denoted by $p_0$) over the embossing period 0 to t. The substrate topographies in each case (i.e., in both the real polymer 110 and the virtual polymer 110-v) are the same.

In many embossing processes the applied spatial pressure average 430 (denoted by $p_0$) is constant for the duration of the embossing period. For such cases, the virtual pressure 430-v can be written as:

$$p_{s,0}(t) = p_0\left[1 - \exp\left(\frac{-tE}{\eta}\right)\right] \quad (8)$$

In such a situation, the equivalent simulation may be performed by assuming the elastic layer to have an elastic modulus E and the pressure distribution to have a spatial average of $$p_0\left[1 - \exp\left(\frac{-tE}{\eta}\right)\right].$$

Optionally, a simulation with an elastic modulus of $$\frac{E}{1 - \exp\left(\frac{-tE}{\eta}\right)}$$

and an applied pressure distribution with spatial average $p_0$ can be performed.

The use of a scaled Young's modulus or pressure average provides a correct solution for topography when the contact pressure distribution does not change over time. The use of this scaling procedure is valid even when the pressure distribution does change over time, for example when a stamp cavity 525 begins to be filled with polymer 110.

To enable a numerical solution for embossed topographies, one example embodiment of the present invention discretizes the spatial representation of the embossing stamp and the embossed substrate.

Figure 6B:
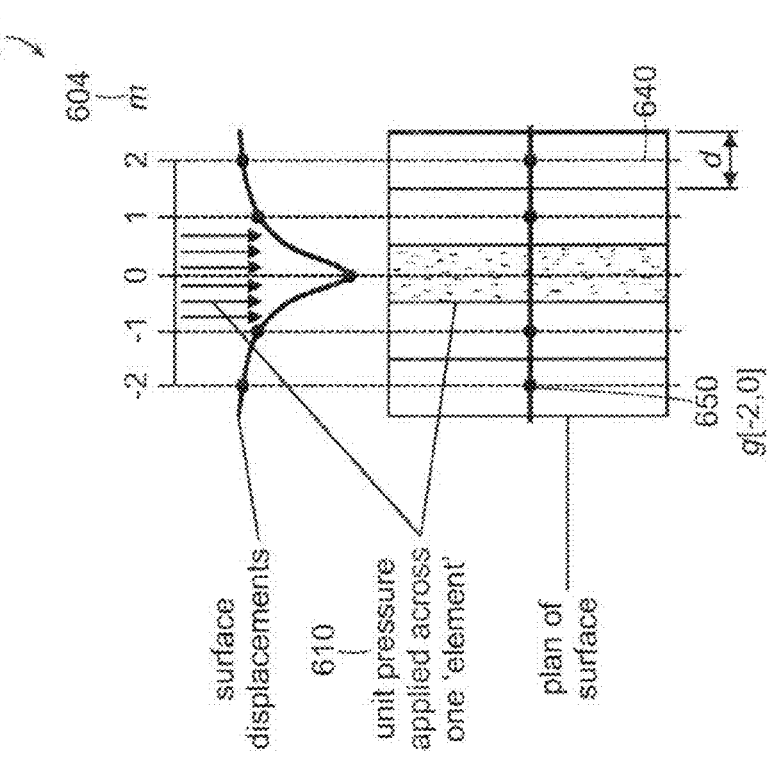
FIG. 6b illustrates discrete representations of the point-load responses of elastic layers in a plane strain case.
Figure 6A:
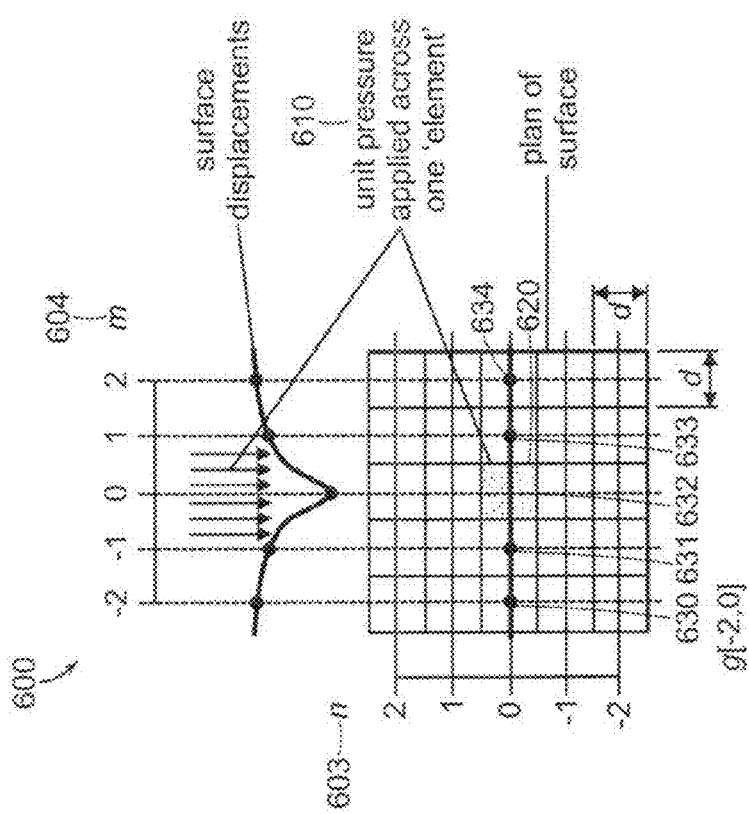
FIG. 6a illustrates discrete representations of the point-load responses of elastic layers in a three-dimensional case.

FIG. 6a illustrates discrete representations of the point-load responses of elastic layers in a three-dimensional (3-D) case 600 according to an example embodiment of the present invention. In this example embodiment, the system inputs 610 is considered to be applied in the central d×d region of the surface 620, and values of surface deformation g[m,n] 630, 631, 632, 633, 634 (e.g., g[-2,0] 630) are defined at the center of each region.

FIG. 6b illustrates discrete representations of the point-load responses of elastic layers in a plane strain case 601 according to an example embodiment of the present invention. The system inputs may include pressure (e.g., unit pressure), temperature, and so on. The system inputs 610 are considered to be applied to a d-wide strip 640 of infinite out-of-plane extent and values of deformation are defined at the center of each strip 640 (e.g., g[-2] 650).

In both discretized example embodiments 600, 601 of FIGS. 6a and 6b, the stamp and substrate surfaces are discretized on a square grid having pitch d in the x and y directions. The stamp-substrate contact pressures are modeled as being uniform within each element of this square grid and the displacement at the center of each element of the grid approximately represents the displacement throughout the element.

Note that, the term "element" is used to refer to a region represented by a single number in a discretized map of pressure or topography and is not to be confused with its more common usage for describing the finite element method.

The example embodiment computes the topography at time t by simulating a "virtual", purely elastic layer of Young's modulus E, statically loaded with a virtual pressure distribution $p_s[m, n]$ (compressive positive) having an appropriate spatial average that is a function of the material properties, the loading time, and the true spatial average of the contact pressure.

The "point-load" response of the purely elastic, virtual substrate adopted for the simulation is defined as the surface response to unit pressure applied uniformly over the element [0, 0]. The displacement (negative into the substrate) at the center of each element of the surface [m, n], where x=md and y=nd, is:

$$g[m, n] = -\frac{1-\nu^2}{\pi E}\left[\begin{array}{l} f(x_2, y_2) - f(x_1, y_2) - \\ f(x_2, y_1) + f(x_1, y_1) \end{array}\right] \quad (9)$$

where $$f(x, y) = y\ln(x + \sqrt{x^2 + y^2}) + x\ln(y + \sqrt{x^2 + y^2})$$

and $x_1 = md - d/2;$ $x_2 = md + d/2;$ $y_1 = nd - d/2;$ $y_2 = nd + d/2.$

The above relationship for g[m,n] provides the means for making approximate simulations of the embossing of three-dimensional substrates by representing surface deflections in a two-dimensional (2-D) matrix (as shown in FIG. 6a). There may also be situations in which the embossing of a prismatic pattern needs to be represented. In those cases, a plane-strain representation of the embossed substrate is more efficient, and surface deflections are represented with a one-dimensional (1-D) vector (as illustrated in FIG. 6b). The response of the viscoelastic surface to unit pressure, applied over the infinitely long, d-wide strip of substrate at m=0, is (27, p. 148):

$$g[m] = -\frac{1-v^2}{\pi E}\left[\begin{array}{l} d\left(m+\frac{1}{2}\right)\ln(2m+1)^2 - \\ d\left(m-\frac{1}{2}\right)\ln(2m-1)^2 + const. \end{array}\right] \quad (10)$$

The present example embodiment assumes that the pressure distribution applied to the substrate is periodic in space (i.e., in both horizontal (x) and vertical y (i.e., m 604 and n 603) when modeling 3-D embossing and in horizontal (x, i.e., m 604) when modeling plane-strain embossing). The example embodiment also assumes that the embossed substrate is infinite in lateral extent. These are realistic approximations for the many embossing processes in which a wafer-sized substrate is embossed using a stamp that is tiled with many copies of a device to be manufactured. If the true stamp pattern is not roughly (or exactly) spatially periodic, the representation of the stamp may be padded with zero-contact-pressure regions at the edges. This is to ensure that the assumption of periodicity does not affect simulation results.

The assumption of periodicity allows for evaluating the convolution of pressure with the impulse response using discrete Fourier transforms. The present example embodiment assumes a period of M elements in the m direction and N elements in the n direction (the assumption of N elements in the n direction is only for the 3-D case). In the equations describing discrete convolution below, m' and n' are coordinates in the spatial frequency plane, $p_s[m, n]$ is the "virtual" applied pressure distribution whose spatial average is as described in Equation 6, and w[m, n] is the true resulting topography:

$$G[m', n'] = \sum_{m=0}^{M-1} \exp\left(\frac{-2\pi jmm'}{M}\right) \sum_{n=0}^{N-1} \exp\left(\frac{-2\pi jnn'}{N}\right) g[m, n] \quad (11)$$

$$P[m', n'] = \sum_{m=0}^{M-1} \exp\left(\frac{-2\pi jmm'}{M}\right) \sum_{n=0}^{N-1} \exp\left(\frac{-2\pi jnn'}{N}\right) p_s[m, n]$$

$$w[m, n] = \frac{1}{MN}\sum_{m'=0}^{M-1} \exp\left(\frac{2\pi jmm'}{M}\right)\sum_{n'=0}^{N-1} \exp\left(\frac{2\pi jnn'}{N}\right) P_s[m', n']G[m', n']$$

This convolution procedure may be implemented using available methods such as fast Fourier transforms and used in algorithms for finding the values of $p_s[m, n]$ and w[m, n] that are consistent with viscoelastic properties of the substrate's and the application of a known spatial-average pressure to the back of the rigid stamp having topography $w_{stamp}[m, n]$. One example of such algorithms (34) proceeds as follows:
1. The algorithm begins by making an initial guess for the set of stamp elements, C, in contact with the substrate. The portion of the stamp in which $w_{stamp}[m, n]$ takes its minimum value is considered to be initially in contact with the substrate.
2. A contact pressure distribution $p_s[m, n]$ is found such that it satisfies equilibrium with the known applied average pressure, $p_{s,0}(t)$, and that is consistent with the stamp remaining rigid while the polymer deforms. The virtual applied pressure distribution, $p_s[m, n]$, is taken to be zero for all [m, n] outside the assumed stamp-substrate contact region C.

In order to find $p_s[m, n]$, the algorithm proceeds as follows:
  a. A set of pressures $p_f[m, n]$ is found such that the set of pressures are required to deform the substrate into the shape $w_{stamp}[m, n]$ within the contact region. The shape adopted by the substrate outside the contact region is constrained only by the mechanical response of the substrate. A stabilized bi-conjugate gradient method (35) may be used, together with the convolution procedure (denoted by *) of Equation (11):

$$w_f[m,n] = p_f[m,n]*g[m,n]$$

$$p_f[m,n] = 0 \,\forall(m,n)\notin C$$

$$w_f[m,n] = w_{stamp}[m,n] \,\forall(m,n)\in C \quad (12)$$

b. A set of pressures $p_e[m, n]$ is found that is consistent with unit displacement of every element of C:

$$w_e[m,n] = p_e[m,n]*g[m,n]$$

$$p_e[m,n] = 0\,\forall(m,n)\notin C$$

$$w_e[m,n] = 1\,\forall(m,n)\in C \quad (13)$$

c. The estimate of $p_s[m, n]$ may then be found as the superposition of $p_f[m, n]$ and whatever multiple, Δ, of $-p_e[m, n]$ makes the spatial average of $p_s[m, n]$ equal that calculated in Equation (6):

$$p_s[m, n] = p_f[m, n] - \Delta p_e[m, n] \quad (14)$$

$$\frac{1}{MN}\sum_{m=1}^{M}\sum_{n=1}^{N} p_s[m, n] = p_{s,0}$$

The estimate of w[m, n] is then $p_s[m, n]*g[m, n]$. Symbol Δ denotes the rigid-body displacement of the stamp, defined positive-downwards into the material.
3. A refined estimate may be made of the parts of the stamp in contact with the polymer. Cells are added to the contact set C, where $w[m,n] > w_{stamp}[m,n] - \Delta$ (i.e., substrate material cannot intersect stamp material). Cells are removed from C where $p_s[m,n] < 0$ (i.e., the stamp is assumed not to stick to the substrate).
4. The second step (i.e., Step 2) of the algorithm is repeated, using the refined estimate of the contents of set C, until either the contact set estimate is unchanged with a new iteration or a pre-defined maximum number of iterations is completed.

The example embodiment operates at a higher speed than many methods available in the art because the second step (i.e., Step 2) of the algorithm involves solving sets of linear equations and because non-linearities in the model are dealt with by straightforward addition and removal of elements of C, rather than by, for example, solving sets of simultaneous, non-linear equations. The non-linearity involved in establishing the true contents of the contact set C is contained within Step 3.

Substrate Thickness and Compression

Figure 7B:
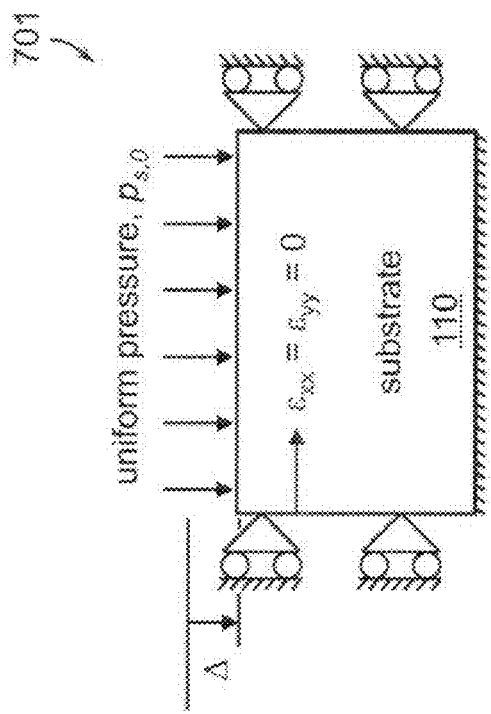
FIG. 7b is an illustration of representation of global compression of finite-thickness substrates under uniform applied pressure in the z direction.
Figure 7A:
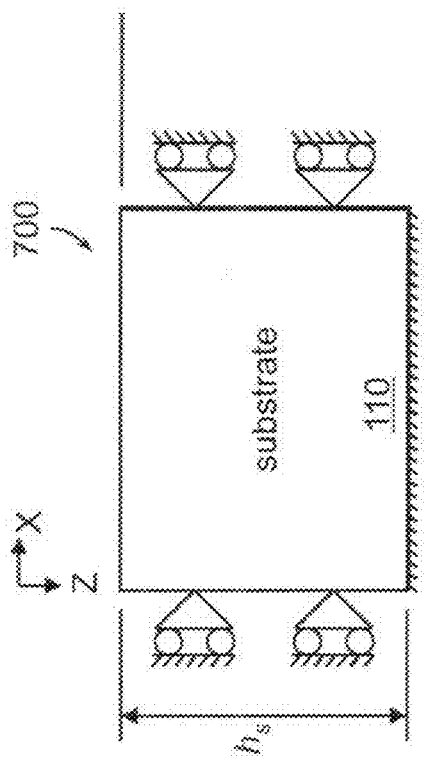
FIG. 7a is an illustration of representation of global compression of finite-thickness substrates before loading.

FIG. 7a is an illustration 700 of representation of global compression of finite-thickness substrates before loading FIG. 7b is an illustration 701 of representation of global compression of finite-thickness substrates under uniform applied pressure in the z direction.

The surface-response expressions given in Equations 9 and 10 are derived for an infinitely thick embossed layer. Given that layer deflections and the characteristic dimensions of the features being embossed are much smaller than the true thickness of the substrate 110, it is reasonable to assume that the shape of the topography arising from spatial variation of the applied contact pressure will be substantially insensitive to the actual layer thickness. At the bottom of such a layer, the stress is almost indistinguishable from the stress that arises if a uniform contact pressure is applied at the top of the substrate. The amount of global compression of the substrate depends strongly on the original layer thickness and the average applied contact pressure. This global compression can be captured in the calculated value of $\Delta$ by adding a constant term to every element of the filter $g[m, n]$ or $g[m]$.

Assuming that the substrate 110 is either infinite in extent and experiences a periodic pressure distribution or laterally clamped at its edges, one example embodiment of the present invention represents the global compression of the substrate as shown in FIGS. 7A and 7B. The applied embossing pressure is modeled as a uniform $p_{s,0}$; the infinite extent of the substrate in x and y or, equivalently, clamped substrate edges are reflected by the imposition of zero strain in the x and y directions. Therefore, defining strains as positive-compressive:

$$E\varepsilon_{zz} = p_{s,0} - v(p_{xx} + p_{yy}) \quad (15)$$
$$E\varepsilon_{xx} = 0 = p_{xx} - v(p_{yy} + p_{s,0})$$
$$E\varepsilon_{yy} = 0 = p_{yy} - v(p_{xx} + p_{s,0})$$
$$\varepsilon_{zz} = \frac{p_{s,0}}{E}\left(1 - \frac{2v^2(1+v)}{1-v^2}\right)$$

The convolution of a uniform contact pressure distribution of magnitude $p_{s,0}$ with the filter $g[m, n]$ implies the following displacement, $\Delta$, of the substrate surface:

$$\Delta = p_{s,0} \sum_{n=0}^{N-1} \sum_{m=0}^{M-1} g[m, n] \quad (16)$$

and $\Delta$ is proportional to the initial substrate thickness, $h_s$:

$$\Delta = \varepsilon_{zz} h_s \quad (17)$$

such that:

$$\sum_{n=0}^{N-1} \sum_{m=0}^{M-1} g[m, n] = \frac{h_s}{E}\left(1 - \frac{2v^2(1+v)}{1-v^2}\right). \quad (18)$$

The global compression behavior of the substrate may be approximated by adding a constant value to every element of $g[m, n]$ such that it satisfies Equation 18 above. The same approach is applicable in the plane-strain case. The shape of the simulated topography is not affected by this constant term in the filter (i.e., the only effect is a change in the rigid-body stamp displacement $\Delta$).

Since PMMA is essentially incompressible above its glass-transition temperature (20), in all subsequent embossing simulations it may be assumed that Poisson's ratio equals 0.5. The values of $g[m, n]$ or $g[m]$ are therefore shifted so that the filter's mean value is zero.

The displacements of a rigid-body stamp for the embossing of compressible substrates of finite thickness may be represented by adjusting the shift-constant appropriately.

In some embossing situations, it is inappropriate to model the substrate as infinite in lateral extent or as laterally clamped at its edges. In such cases, the global compression of the substrate is a function of the specific substrate geometry and the coefficients of friction between the substrate and the surfaces with which it is in contact. As a result, care must be taken when using this modeling approach to simulate a "displacement-controlled" embossing system in which the rigid body motion of the stamp is prescribed and the contact pressure average is allowed to vary accordingly. In displacement control, unless the global compliances of the substrate and of the embossing machine are well modeled, simulation of the fidelity of a micro-embossed pattern is unlikely to be reliable. In force-controlled embossing, meanwhile, the fidelity of pattern filling may be well simulated without an accurate model of the overall compliance of the substrate or embossing machine.

Level of Discretization Required for a Realistic Solution

Figure 8:
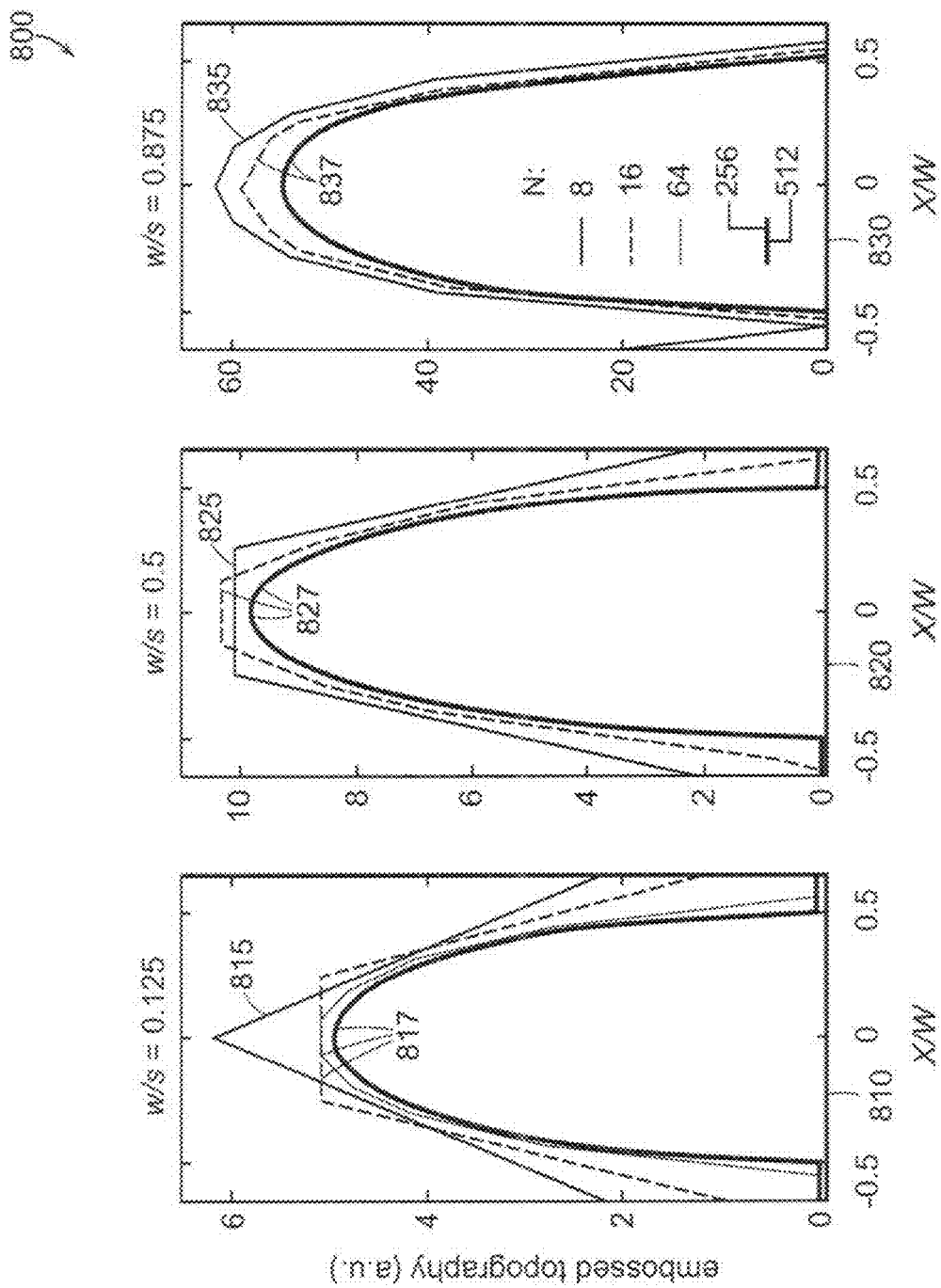
FIG. 8 includes plots of simulated topographies of material penetrating one of an infinite array of long, parallel trenches.

FIG. 8 includes plots of simulated topographies 800 of material penetrating one of an infinite array of long, parallel trenches. These plots were generated using simulations performed at a range of levels of discretization for each geometry, where the number of elements spanning s in the discretized representation of the stamp (N) ranges from 8 to 512. As shown in FIG. 8, simulated topographies are mainly consistent with one another to within approximately 5%, provided that each feature on the stamp, whether a cavity or ridge, is represented by at least four elements.

Simulations are performed to establish how finely the representation of a stamp should be discretized to secure meaningful results. These test simulations represent the partial penetration by an elastic deformable layer into an array of long, narrow cavities with width w and pitch s. Predicted topographies are compared for a range of width-to-pitch ratios, w/s, and for several levels of coarseness of discretization of the stamp. The plots shown in FIG. 8 represent cross-sections of the simulated topographies.

In the simulation cases 810, w/s=0.125. In the simulation case 815, where the stamp pitch s is represented by only eight spatial elements, the stamp cavity itself occupies only one spatial element. In this case 815, the peak penetration distance predicted is approximately 20% larger than predictions made at finer levels of discretization 817. As soon as the cavity is represented by four or more spatial elements, further refinement of the discretization affects the predicted peak penetration distance by only a few percent.

In simulation cases 820, w/s=0.5, and in each of the illustrated discretization cases 825 and 827, the cavities and ridges of the stamp are represented by four or more spatial elements and simulated cavity penetrations agree within less than 10%.

In cases 830, w/s=0.875. In simulation case 835, the ridges separating the cavities of the stamp are each represented by only one spatial element, and the predicted cavity penetration 835 is approximately 15% higher than predicted for much finer levels of discretization 837.

The plots 810, 820, 830 shown on FIG. 8 illustrate that further refinements of the level of discretization make no more than a few percent difference to the amplitudes of the predicted topographies, provided that each stamp cavity or ridge is represented by at least four spatial elements.

The discrepancies observed at the coarsest levels of discretization may be overcome through the use of "singular" pressure elements to represent the edges of contact regions or by the representation of contact pressure using overlapping elements having a pyramidal pressure distribution (27, page 145).

Temperature Dependence of Viscosity and Elasticity

An example embodiment of the present invention adopts the following phenomenological functions for the temperature-dependence of η and E. The model used to represent the Young's modulus, E, is a simplified version of that used by Arruda and Boyce (19). The model used for viscosity represents a straightforward Williams-Landel-Ferry temperature-dependence (36).

$$E(T) = 0.5(E_g + E_r) - 0.5(E_g - E_r)\tanh\left(\frac{T - T_g}{\Delta T}\right) \quad (19)$$

$$\eta(T) = \eta_0 \exp\left(\frac{-c_1(T - T_g)}{c_2 + T - T_g}\right) \quad (20)$$

Symbol $E_g$ represents the glassy value of the elastic modulus, exhibited by the material at temperatures well below the glass transition. Symbol $E_r$ is the rubbery value of the modulus, exhibited well above the glass transition. Symbols $c_1$, $c_2$, $\eta_0$ and $\Delta T$ represent material constants.

Modeling Assumptions

The description of the material response to a point load and the use of superposition to build a simulation of an embossed topography is obtained under the assumption that material deflections are small. These deflections are small compared with the thicknesses of the embossed substrates (i.e., 10-50 μm embossed depths are typical while substrates are usually approximately 1 mm in thickness). However, the local curvatures of hot embossed surfaces are not always small and often include sharp edges. The assumption of small deflections is therefore an imperfect assumption. However, this assumption may be made to enable fast computation.

One prerequisite for the validity of the superposition approach is that the stress-strain behavior of the material can be modeled linearly. However, non-linearities in the mechanical behavior of amorphous polymers have been widely documented. For example, the relationship between shear stress and the rate of plastic flow has been found to follow a power-law relationship. Moreover, marked stiffening of material is seen at strains of approximately 1, corresponding to the polymer networks aligning and stretching (20). The main concern is whether the range of geometries and processes that are expected in hot micro-embossing can be satisfactorily represented using a linear approximation to the behavior of material.

Another possible assumption for validity of the superposition approach is that the embossing process is satisfactorily modeled isothermally. Sufficient dissipative heating of the polymer during plastic flow could substantially reduce the material compliance and invalidate the simulations. However, since the average strain rate is expected to be 0.01/s or less throughout the embossed substrate (although perhaps substantially higher within a few microns of the polymer surface, where the intricate geometries are being formed), the assumption that any heat generated during plastic deformation can be dissipated quickly enough to ensure that the material remains effectively isothermal is a valid assumption.

Additionally, the contraction of the embossed topography that occurs when it is cooled under load may be assumed to be negligible. These contractions are typically approximately 1% for amorphous polymers and normal temperature swings of approximately 50 K or less. Thus, these contractions are not expected to make a substantial difference to the relief of embossed patterns.

One example embodiment of the present invention employs a linear viscoelastic model to achieve computational speed. The example embodiment monitors possible discrepancies as it attempts to fit the linear viscoelastic model to experimental data. The example embodiment assumes that embossing stamp is perfectly rigid. Typical stamp materials are silicon or nickel, both of which have elastic moduli greater than 100 Giga Pascals (i.e., GPa). To prevent stamp bending and/or fracture in the embossing set-up considered the backsides of all stamps are in contact with a rigid steel block. The effective stiffness of the embossed polymeric layer (i.e., $E/[1-\exp(-tE/\eta)]$) may range from a few hundred Mega Pascals (i.e., MPa) (for temperatures slightly above $T_g$ and short loading durations) to approximately 1 MPa at higher embossing temperatures. Thus based on the stiffness of the embossed polymeric layers, it appears entirely reasonable to model the stamp as stiff.

Since the dominant component of the substrate's behavior is elastic, the example embodiment may consider any capillary forces at the stamp-substrate interface to be negligible.

Additionally, as a simplifying assumption, the example embodiment may also assume that there is no friction between the stamp and the embossed substrate.

Hierarchical Simulation of Complex Patterns

Figure 9:
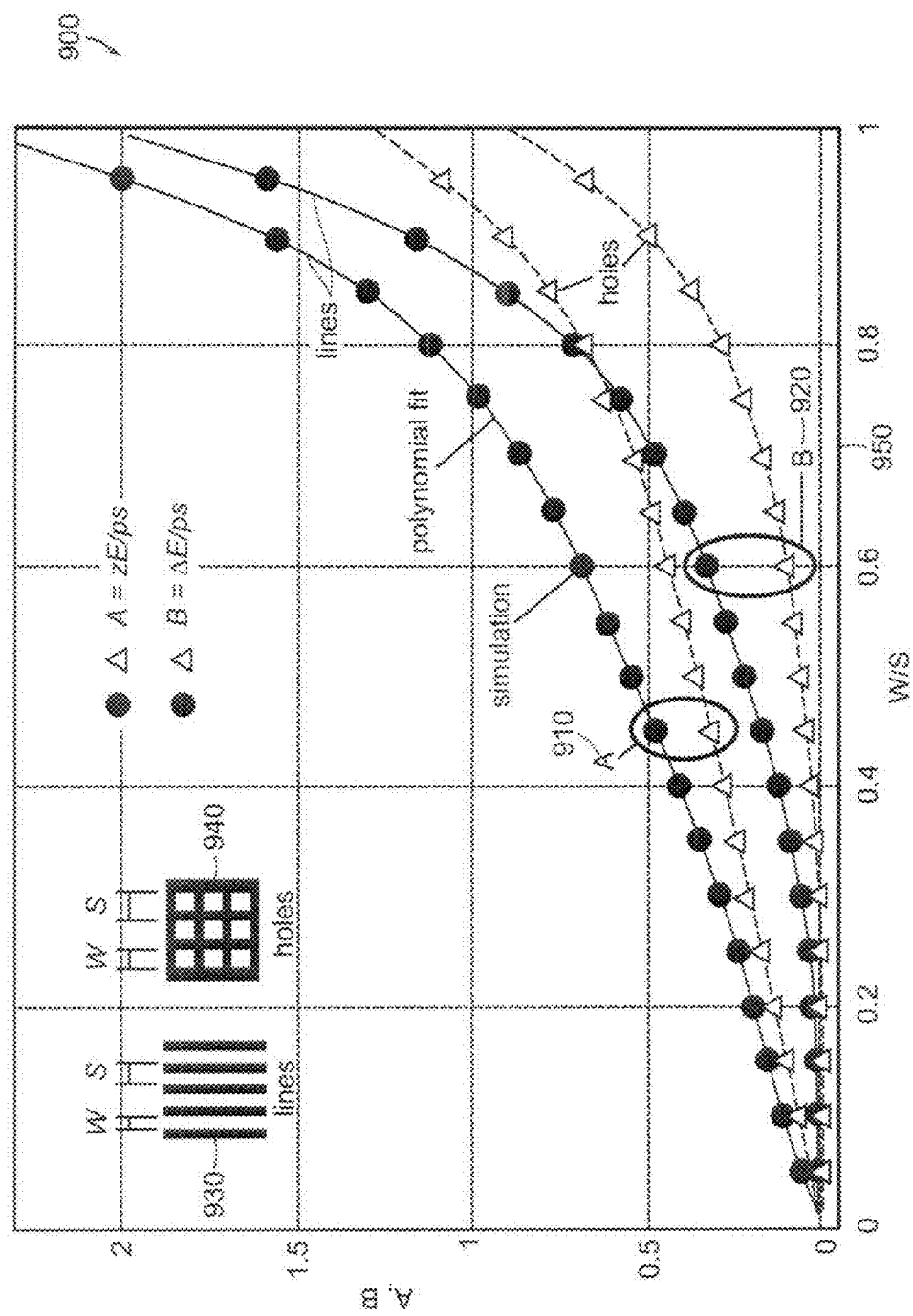
FIG. 9 includes plots that illustrate non-dimensional parameters A and B, describing cavity penetration and stamp displacement in the embossing of an incompressible layer.

FIG. 9 includes plots 900 that illustrate non-dimensional parameters A 910 and B 920, describing cavity penetration and stamp displacement in the embossing of an incompressible layer. Parameters (also referred to as processing parameters herein) are shown for stamps patterned with infinite arrays of (i) parallel trenches 930 and (ii) square holes 940.

Many practical patterns may be too complex to simulate within an affordable time, if a stamp representation that is discretized at the level of individual features is used. One example embodiment of the present invention relates to developing a method and a corresponding apparatus for representing stamps at arbitrarily coarse levels of spatial discretization, where each spatial element of the stamp is described as containing many identical features of a certain shape, size, and a real density. Using this coarse representation of complex stamps, fast simulations may be performed to predict the extent of stamp-cavity filling as a function of the processing parameters and layout of the pattern on the stamp.

The example embodiment may find the relationship between the applied pressure, the processing parameters, and the resulting embossed topography for some simple, regular patterns of infinite extent. For example, these relationships for stamps carrying long, parallel trenches and arrays of square holes maybe explored. The simulation procedure developed in the previous sections may be used to find these pressure-topography relationships. In order to perform the simulations, the example embodiment may choose an appropriate "dummy" substrate stiffness and a range of average pressures to apply to the stamp. At this stage, the material may be assumed to be incompressible, which constrains the relationship between cavity filling and stamp displacement.

Since the material is assumed to behave linearly, the pressure-topography relationship may be non-dimensionalized. For initial cavity filling (i.e., before any material has touched the tops of the cavities) the pattern may be described using two non-dimensional parameters: A, the non-dimensional cavity penetration depth 910, and B, the non-dimensional rigid-body displacement of the stamp 920:

$$A = \frac{z_{pk}E}{p_s s} \quad 21$$

$$B = \frac{\Delta E}{p_s s} \quad 22$$

In the above Equations, $z_{pk}$ is the peak penetration of the cavity, E is the material's elastic modulus, $\Delta$ is the rigid-body displacement of the stamp, s is the pitch of the pattern, and $p_s$ is the function of average applied pressure, elasticity, viscosity, and loading duration that is given in Equation 6.

Parameters A 910 and B 920 (FIG. 9) are illustrated as a function of the ratio of cavity width to cavity pitch 950 (denoted by w/s) for stamps patterned with long trenches and with square holes. By fitting polynomial functions to capture these relationships, the extent of cavity filling for patterns with any value of w/s 950 may be predicted.

The characterization simulations are extended to describe what happens as material reaches the tops of the cavities. Under the assumption of material incompressibility, the proportion, $(V/V_0)$, of the total cavity volume of the stamp that is filled with material is linked to the stamp's displacement ($\Delta$) as follows:

$$\frac{V}{V_0} = \frac{\Delta s}{wh} \text{ for long trenches;} \quad 23$$

$$\frac{V}{V_0} = \frac{\Delta s^2}{w^2 h} \text{ for square holes.}$$

FIG. 10 includes plots 1000 that illustrate the relationship between proportion of the total cavity volume of the stamp 1010 (i.e., $V/V_0$) and non-dimensional pressure 1020 (i.e., $p_s sA/Eh$), where h is the height of the cavity. As shown in FIG. 10, the proportion of the total cavity volume of the stamp 1010 (i.e., $V/V_0$) approaches one (i.e., $V/V_0 \rightarrow 1$) for very large non-dimensional pressure 1020 (i.e., $p_s sA/Eh$), and in this rubbery model perfect filling of the cavities is indeed consistent with infinite $p_s sA/Eh$. Thus, the model predicts that the corners of cavities never quite fill.

The relationship between $V/V_0$ and $p_s sA/Eh$ may be abstracted using a piecewise-linear function. A simplifying assumption is made that once a cavity volume is 95% over it cannot fill any further. Therefore, there are three linear regions: an initial region in which $V/V_0$ is directly proportional to $p_s sA/Eh$ and no material has reached the top of a cavity, a second region in which $V/V_0$ increases more slowly with $p_s sA/Eh$ as material is pushed into the corners of the cavity, and a flat region in which no further filling is considered possible.

Figures 11A, 11B:
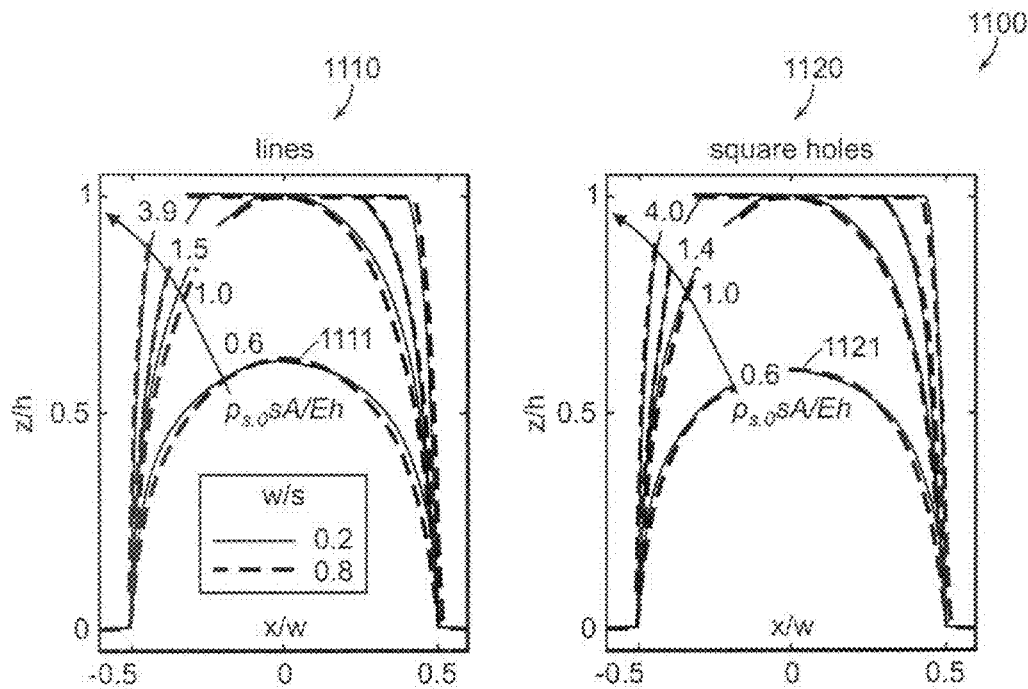
FIGS. 11a and 11b include plots that illustrate simulated polymer topographies when embossed with stamps patterned with arrays of long trenches or square holes.

FIGS. 11a and 11b include plots that illustrate simulated polymer topographies when embossed with stamps patterned with arrays of (a) long trenches 1110 and (b) square holes 1120 having ratio of cavity width to cavity pitch (i.e., w/s) values of 0.2 and 0.8. The plots of FIGS. 1a and 11b are plotted on normalized axes. In these normalized representations, the shape of material penetrating the cavities is seen to be relatively insensitive to the value of width-to-space ratio (i.e., w/s).

As shown on FIGS. 11a and 11b, the shapes of the non-dimensionalized relationships have only a mild dependence on the ratio w/s. This is because most of the effect of w/s is captured in the non-dimensional parameter A. The relationships for all w/s may be perfectly collapsed on to a single line in the region $$\frac{p_s sA}{Eh} < 1$$

by instead plotting the relationship between $$\frac{\Delta A}{Bh} \text{ and } \frac{p_s sA}{Eh},$$

1111, 1121 although such a graph is perhaps a less intuitive representation of cavity filling because the relationships diverge for $$\frac{p_s sA}{Eh} > 1.$$

This characterization procedure may be performed for any "primitive" geometries (e.g., trenches and holes) that are likely to be deployed in stamp designs. Characterization could also be done for custom-designed cells that are used repeatedly in a stamp design. For example, a common type of junction between fluidic channels or a nano-fluidic filter element may be characterized in terms of a relationship between dimensionless average contact pressure $$\frac{p_s sA}{Eh}$$

and dimensionless fill-factor or stamp displacement $V/V_0$.

Between touching and filling, the selected piecewise linear approximations underestimate the degree of filling for a given applied pressure by up to approximately 20%. However, when filling is approximately 95% or more complete, the approximation returns closer to reality. This approximation is expected to be acceptable because the simulation tool being used is likely to be used primarily to check for completeness of filling.

Figure 12:
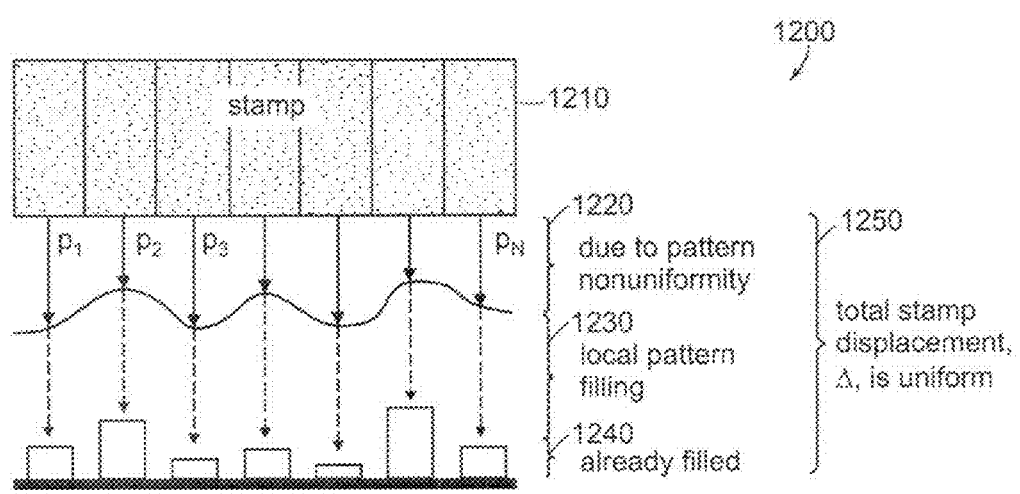
FIG. 12 illustrates the integration of abstracted pressure-filling relationships with a model of underlying substrate deformation to perform a hierarchical simulation of the filling of rich patterns according to an example embodiment of the present invention.

FIG. 12 illustrates the integration of abstracted pressure-filling relationships with a model of underlying substrate deformation to perform a hierarchical simulation of the filling of rich patterns according to an example embodiment 1200 of the present invention. As shown in FIG. 12, the stamp 1210 causes a uniform total stamp displacement 1250 (i.e., $\Delta$). The total stamp displacement 1250 is resulted from displacement due to pattern non-uniformity 1220, displacement resulting from local pattern filling 1230, and displacement due to areas of the substrate that are already filled 1240.

The example embodiment 1200 performs the second stage in building a hierarchical simulation by tying together the abstract representations of each spatial element of the heterogeneously patterned stamp 1210, so that the pressure distribution can be found across the stamp 1210. The example embodiment 1200 models any fine patterning within each element of the stamp as being superimposed upon a coarse stamp topography $w_{stamp}[m, n]$. This approach allows multi-scale stamps to be easily represented. For example, the example embodiment 1200 may succinctly describe multi-micron-scale fluidic channels in conjunction with nano-structured surfaces on a stamp.

A single value is to be found for the average contact-pressure, $p_s[m, n]$, within each element of the abstracted stamp 1210, and the displacement of the stamp 1210 in each element is composed of two parts. The example embodiment 1200 assumes that $w_1[m, n]$ is the part of the stamp displacement associated with the displacement of material into any finely-patterned cavities inside stamp element [m, n]. The example embodiment 1200 also assumes that $w_2[m, n]$ is the displacements associated with the variation of $p_s[m, n]$ from element to element of the abstracted stamp. The example embodiment 1200 computes this part by convolving $p_s[m, n]$ with the deflection-response of the substrate to unit pressure applied within one of the elements of the coarse stamp representation. The stamp 1210 is assumed to be rigid and not to rotate. Therefore, the total displacement of the stamp is constrained by:

$$w_1[m,n]+w_2[m,n]=w_{surf}[m,n]-\Delta_{global} \forall (m,n) \in C$$

$$p_s[m,n]=0 \forall (m,n) \notin C, \quad\quad 24$$

where C is the set of coarse spatial elements in which the polymeric substrate makes at least some contact with the stamp, and $\Delta_{global}$ is the rigid-body displacement of the whole stamp.

In a special case in which $w_{stamp}[m, n]$ is zero everywhere, and in which the fine pattern is identical in every part of the stamp, $w_2[m, n]$ would be zero everywhere. Meanwhile, $w_1[m, n]$ is zero in any cells in which the stamp surface is flat and contains no cavities.

The solution procedure may be modified from that of Equations 12 to 14. Similar to the iterations used to find the contact set C, the example embodiment 1200 may also iterate to find the elements in which the coarse grid the finely patterned cavities are partially or fully filled. This approach ensures that whenever sets of simultaneous equations are solved, they are linear. The simulation proceeds according to the following steps:

1. The non-dimensional relationships between $V/V_0$ and $p_s sA/EH$ are converted into direct pressure-displacement $p_s$-$\Delta$ relationships for each element of the coarse stamp representation.

Figure 13:
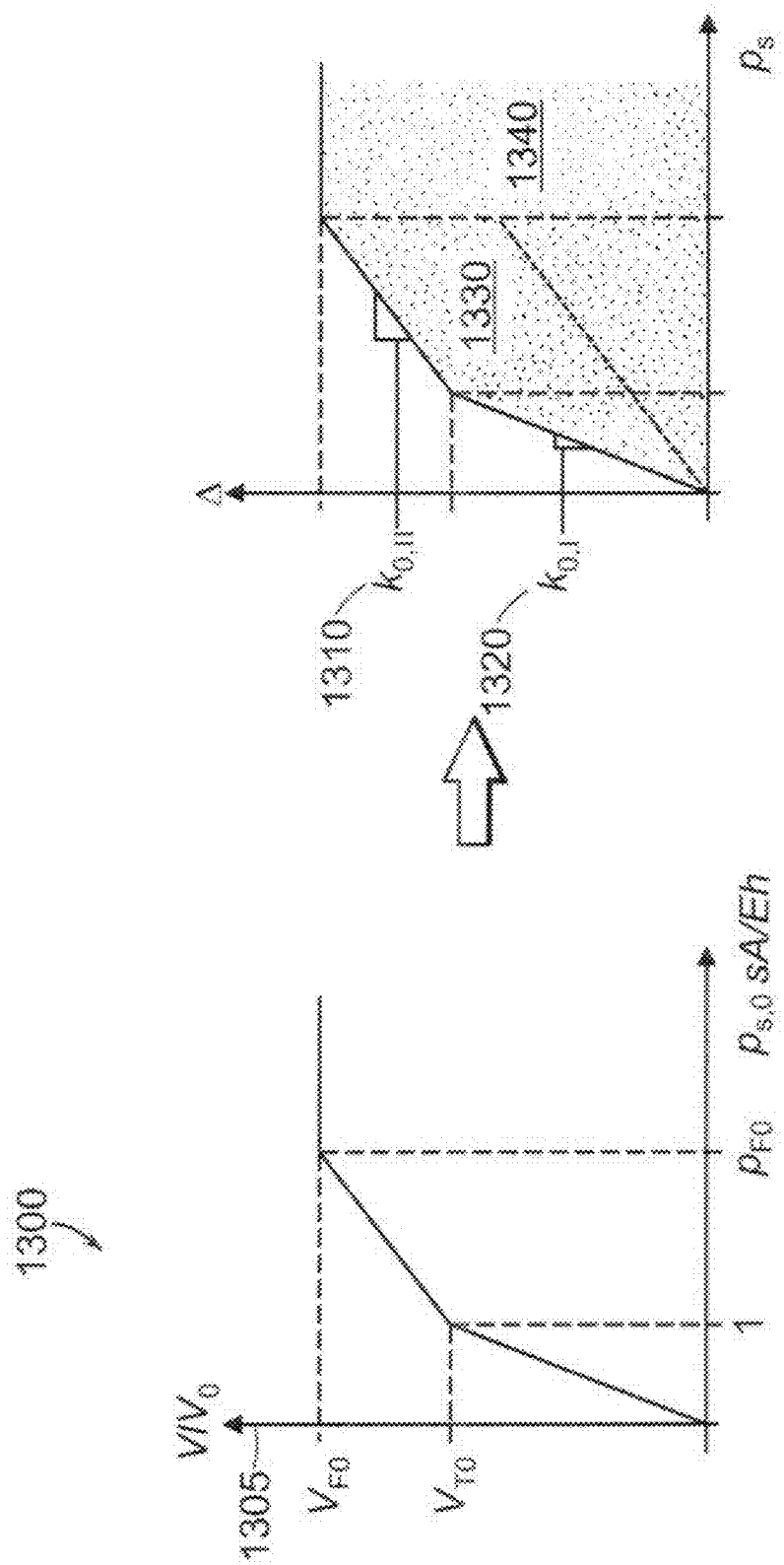
FIGS. 13a and 13b illustrate the conversion of a non-dimensional pressure-penetration relationship.

FIGS. 13a and 13b illustrate the conversion of a non-dimensional pressure-penetration relationship 1300 according to an example embodiment of the present invention. In FIG. 13a, the non-dimensional pressure-penetration relationship is converted into a specific pressure-displacement relationship, as illustrated in FIG. 13b. This conversion may be carried out, for example, by scaling the axes of FIG. 13a according to the specific values of the geometrical and material parameters. This conversion is performed for each region of a patterned stamp.

Figures 10A, 10B:
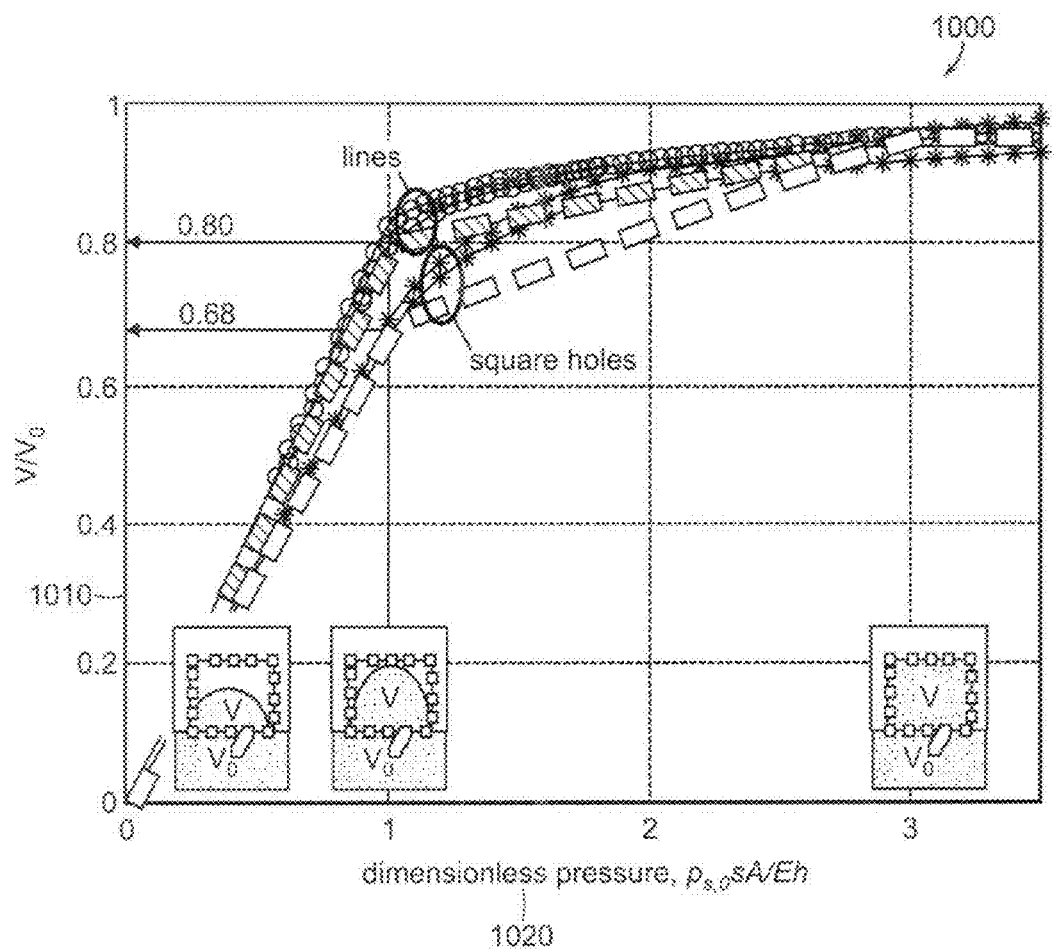

FIG. 10b includes a table that illustrates examples of abstraction parameters that may be used for hierarchical simulation of the embossing of trenches and holes shown in FIG. 10a. The values given in FIG. 10b correspond to coordinates, on the $V/V_0$ 1305 vs.

$$\frac{p_s sA}{Eh} \quad 1307$$

graph 1300 shown in FIGS. 13a.

2. Each ps-$\Delta$ relationship has three characteristic gradients 1310, 1320 (denoted by $k_{0, I-III}$) and three characteristic constants 1330, 1340 (denoted by $k_{1, I-III}$). These characteristic gradients and constants are defined as follows:

$$k_{0,I} = \frac{sB}{E} \quad\quad 25$$

$$k_{0,II} = k_{0,I} \left[ \frac{V_{F0} - V_{T0}}{V_{T0}(p_{F0} - 1)} \right]$$

$$k_{0,III} = 0$$

$$k_{1,I} = 0$$

$$k_{1,II} = \frac{Eh}{sA}(k_{0,I} - k_{0,II})$$

$$k_{1,III} = k_{1,II} + k_{0,II}\frac{p_{F0}Eh}{sA}$$

3. The example embodiment 1300 assumes that every element of the stamp is in region I of its pressure-displacement graph (i.e., that no material has reached the tops of any cavities). An initial guess for the contact set C is also made. Usually the portion of the stamp in which $w_{stamp}[m, n]$ takes its minimum value is considered to be initially in contact with the substrate.

4. For each cell [m, n] of the stamp, the example embodiment 1300 employs the current estimate for the occupied region R of the pressure-displacement relationship, where R is one of {I, II, III}, and obtains the local compliance constants $k_0[m, n]$ and $k_1[m, n]$ according to Equation 25.

5. The example embodiment 1300 obtains a contact pressure distribution $p_s[m, n]$ that satisfies equilibrium with the known applied average pressure, $p_{s,0}(t)$ and that is consistent with the stamp remaining rigid while the polymer deforms. The contact pressure distribution $p_s[m, n]$ is taken to be zero for all [m, n] outside the assumed stamp-substrate contact region C.

In order to find $p_s[m, n]$, the example embodiment proceeds according to the following steps:

a. The example embodiment obtains a set of pressures $p_f[m, n]$ that are required to deform the substrate into the shape $w_{stamp}[m, n]$ within the contact region. The shape adopted by the substrate outside the contact region may be constrained only by the mechanical response of the substrate. A stabilized biconjugate gradient method is used, together with the convolution procedure (denoted by *) of Equations 11:

$$w_f[m,n]=p_f[m,n]*g[m,n]-k_0[m,n]p_f[m,n]-k_1[m,n]$$

$$p_f[m,n]=0 \forall (m,n) \notin C$$

$$w_f[m,n]=w_{stamp}[m,n] \forall (m,n) \in C \quad\quad 26$$

b. The example embodiment may find a set of pressures $p_e[m, n]$ that is consistent with unit displacement of every element of C. Because the $p_e[m, n]$ is an estimate of the pressures required for an incremental displacement of the stamp, the constants $k_1[m, n]$ are not employed in this relationship:

$$w_e[m,n]=p_e[m,n]*g[m,n]-k_0[m,n]p_e[m,n]$$

$$p_e[m,n]=0 \forall (m,n) \notin C$$

$$w_e[m,n]=1 \forall (m,n) \in C \quad\quad 27$$

c. The example embodiment may obtain the estimate of $p_s[m, n]$ as the superposition of $p_f[m, n]$ and whatever multiple of $-p_e[m, n]$ makes the spatial average of $p_s[m, n]$ equal to that calculated in Equation (6):

$$p_s[m, n] = p_f[m, n] - \Delta_{global} p_e[m, n] \quad (28)$$

$$\frac{1}{MN}\sum_{m=1}^{M}\sum_{n=1}^{N} p_s[m, n] = p_{s,0}$$

The element $\Delta_{global}$ is the rigid-body displacement of the stamp, defined positive-downwards into the material. The estimate of w[m, n] may be found using:

$$w[m,n] = p_s[m,n]*g[m,n] - k_0[m,n]p_s[m,n] - k_1[m,n] \quad (29)$$

6. Based on the newly estimated pressure-distribution $p_s$[m, n], the example embodiment may revise the estimates of the region, R, of the $p_s$-$\Delta$ graph that is occupied by each cell. The example embodiment may also revise the estimate of the contents of C by adding elements for which w[m, n]>$w_{stamp}$[m, n]−$\Delta_{global}$ and removing elements in which $p_s$[m, n]<0.
7. In an event the most recent iteration has brought about no change in the estimated value of R for any cell or a pre-defined maximum number of iterations have been completed, the example embodiment proceeds to step 7. Otherwise, the example embodiment returns to step 3.
8. For those elements [m, n] that are members of the contact set C, the example embodiment evaluates the fill-factor V/V$_0$ 1305. The example embodiment may also evaluate the topography w[m, n] for the whole area of the stamp. This completes the simulation, providing a useful estimate of the completeness of pattern filling across the stamp.

Using this hierarchical approach, the size of the simulation is no longer governed by the size of the smallest feature on the stamp, but rather by the degree of heterogeneity of the pattern on the stamp. Thus, stamps with large, regular areas containing repetitions of a certain pattern will be more succinctly describable than those with little regularity.

The Effect of Trapped Air

Figure 14:
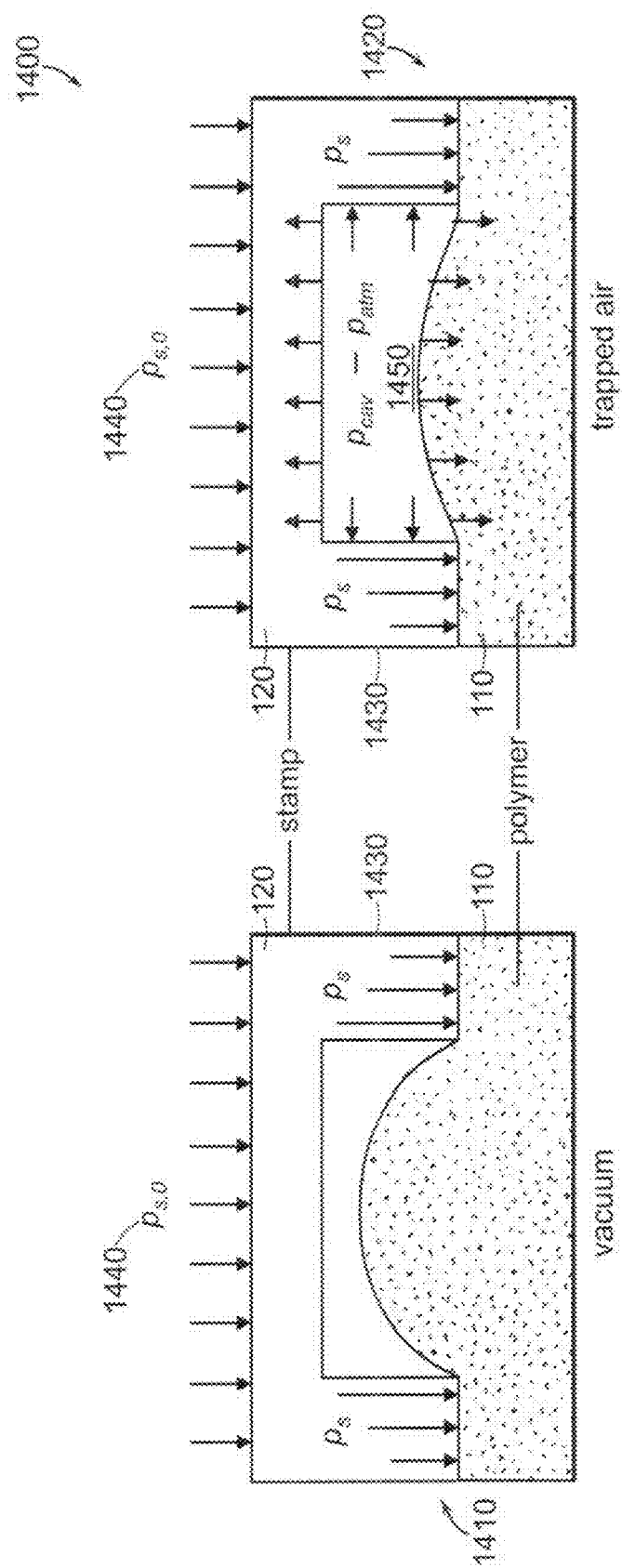
FIG. 14 illustrates an example embodiment of the present invention that accounts for trapped air in cavities.

FIG. 14 illustrates an example embodiment 1400 of the present invention that accounts for trapped air in cavities. For embossing in vacuum 1410, no net forces are exerted on material inside an unfilled cavity. If air is trapped inside the cavity 1420, air of absolute pressure $p_{cav}$ in the cavity exerts a uniform pressure on the cavity boundary. Since ambient air pressure $p_{atm}$ is experienced by all external surfaces of the stamp and substrate, the relevant pressure to be balanced against applied embossing loads is $p_{cav}-p_{atm}$.

Many commercial hot embossing machines do indeed provide a vacuum chamber, but there are plenty of situations (from simple laboratory set-ups to industrial reel-to-reel processing) in which it may be undesirable to have to provide a vacuum. Therefore, the example embodiment extends the model described in previous sections to gain an impression of the influence of air trapped in stamp cavities upon the filling behavior of the stamp.

There are at least two possibilities for the air trapped in a stamp cavity 120. The trapped air may diffuse into the polymeric substrate 110, or it may be compressed as material penetrates the cavity, thus progressively resisting further filling.

In cases when no air diffuses into the polymer 110, provided that there is only a single cavity in the simulated stamp, the simulation procedure presented in the previous sections may be modified to account for the presence of trapped air. The portion of the polymer 110 not in contact with the stamp 120 may be considered to be exposed to a uniform pneumatic pressure whose magnitude is iteratively found, concurrently with the size and shape of the contact region. Because the cavity pressure acts upwards on the stamp as well as downwards on the polymer, the spatial average of all contact and pneumatic pressures acting on the polymer equals the average pressure applied to the back of the stamp. This modified simulation does not attempt to capture the evolving pneumatic pressure in the cavity as material flows, but rather the quasi-static situation that exists for a rubbery polymer after flow is substantially complete. The modified algorithm proceeds according to the following steps:

1. The algorithm begins by making an initial guess for the set of stamp 120 elements, C, in contact with the substrate 110. Usually the portion of the stamp 120 in which $w_{stamp}$[m, n] takes its minimum value is considered to be initially in contact with the substrate 110. The pneumatic pressure inside the cavity, $p_{cav}$, is initially assumed to be $p_{atm}$.
2. Next, a contact pressure distribution $p_s$[m, n] 1430 is found that satisfies equilibrium with the known applied average pressure, $p_{s,0}$(t) 1440, and that is consistent with the stamp 120 remaining rigid while the polymer 110 deforms. To find $p_s$[m, n] 1430, steps (a) to (d) below are used:
    a. The substrate's response, $w_p$[m, n], is calculated for $p_{cav}-p_{atm}$ 1450 applied in the cavity region. The relevant pressure is $p_{cav}-p_{atm}$ 1450 because all surfaces of the stamp 120 and substrate 110 experience the ambient atmospheric pressure $p_{atm}$ at the start of the embossing process, when deflections are zero.

$$w_p[m,n] = p_p[m,n]*g[m,n]$$

$$p_p[m,n] = 0 \forall (m,n) \in C$$

$$p_p[m,n] = p_{cav}-p_{atm} \forall (m,n) \notin C \quad (30)$$

b. A set of pressures $p_f$[m, n] may be obtained. The set of pressures may be required to deform the substrate into the shape $w_{stamp}$[m,n]−$w_p$[m, n] within the contact region. The shape adopted by the substrate outside the contact region may be constrained only by the mechanical response of the substrate. A stabilized biconjugate gradient method may be used, together with the convolution procedure (denoted by *) of Equation 11:

$$w_f[m,n] = p_f[m,n]*g[m,n]$$

$$p_f[m,n] = 0 \forall (m,n) \notin C$$

$$w_f[m,n] = w_{stamp}[m,n] - w_p[m,n] \forall (m,n) \in C \quad (31)$$

c. A set of pressures $p_e$[m, n] may be obtained that is consistent with unit displacement of every element of C:

$$w_e[m,n] = p_e[m,n]*g[m,n]$$

$$p_e[m,n] = 0 \forall (m,n) \notin C$$

$$w_e[m,n] = 1 \forall (m,n) \in C \quad (32)$$

d. The estimate of $p_s$[m, n] 1430 may be found as the superposition of $p_f$[m, n] and whatever multiple, $\Delta$, of −$p_e$[m, n] makes the spatial average of $p_s$[m, n] 1430 equal to that calculated in Equation 6:

$$p_s[m, n] = p_f[m, n] - \Delta p_e[m, n] + p_p[m, n] \quad (33)$$

$$\frac{1}{MN}\sum_{m=1}^{M}\sum_{n=1}^{N} p_s[m, n] = p_{s,0}$$

The estimate of w[m, n] is $p_s$[m, n]*g[m, n]. The element Δ denotes the rigid-body displacement of the stamp, defined positive-downwards into the material.

3. A refined estimate may be obtained from the parts of the stamp in contact with the polymer. Cells are added to the contact set C where w[m, n]>$w_{stamp}$[m, n]−Δ (i.e., to account for the fact that substrate material cannot intersect stamp material). Cells are removed from C where $p_s$[m, n]<0 (i.e., the stamp is assumed not to stick to the substrate). The cavity pressure estimate, $p_{cav}$, is also revised, by taking the estimated topography of polymeric substrate inside the cavity and calculating the ratio of the unfilled cavity volume $V_1$, to its initial volume, $V_0$. The new estimate of $p_{cav}$ is $V_0 p_{atm}/V_1$.

4. Step 2 is repeated with the refined estimates of $p_{cav}$ and the contents of set C, until one of the following requirements is met:
   a. The contact set estimate is unchanged and the cavity pressure is unchanged by more than 5% with a new iteration.
   b. A pre-defined maximum number of iterations is completed.

Figure 15:
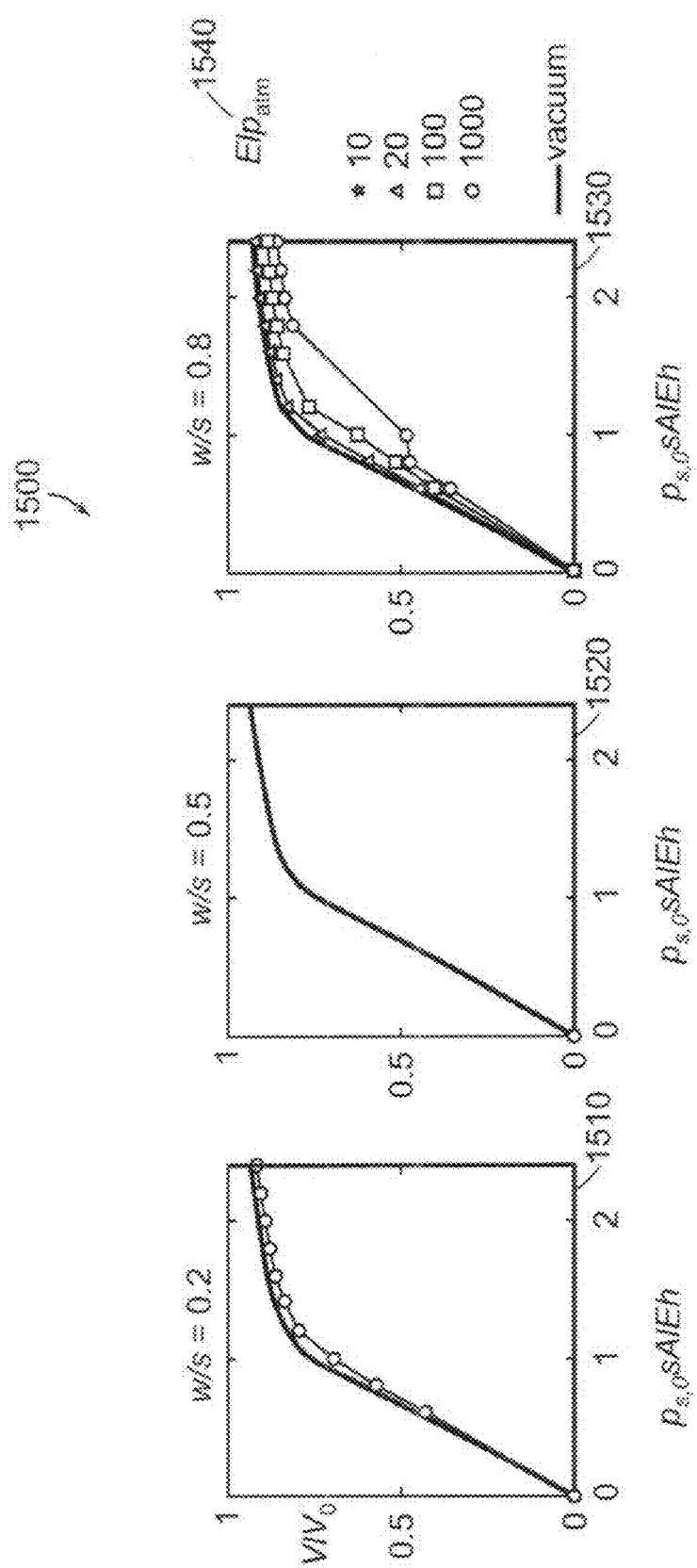
FIG. 15 illustrates modified simulations of pressure-penetration relationships.

FIG. 15 illustrates modified simulations 1500 of pressure-penetration relationships which were plotted under the assumption that air is trapped inside the cavity. The simulations 1500 are of arrays of long trenches, for w/s at 0.2 (1510), 0.5 (1520), and 0.8 (1530) and $E/p_{atm}$ (1540) ranging from 10 to 1000.

In determining the importance of trapped air, one example embodiment considers the relative magnitudes of the pneumatic pressure inside the cavity and the contact stresses applied by the stamp to the substrate. If a particular shape of embossed topography is considered, for doubling the effective stiffness of the material, to retain the exact topography both the force applied to the stamp and the pneumatic pressure inside the cavity would need to double. In other words, if the material becomes stiffer but the ambient atmospheric pressure remains fixed, the impact of the air's presence becomes relatively smaller. The ratio of the material's effective modulus to the ambient atmospheric pressure (i.e., $E/p_{atm}$) 1540 is therefore a guide to the impact of trapped air (i.e., the higher the ratio, the smaller the impact).

In order to obtain the plots shown in FIG. 15, the modified algorithm is used to simulate the embossing of long, closed trenches for three w/s values (0.2, 0.5 and 0.8) 1510, 1520, 1530 and for values of $E/p_{atm}$ 1540 ranging from 10 to 200. Assuming $p_{atm}$ to be 100 kPa, the case of $E/p_{atm}$=10 corresponds to a material stiffness of 1 MPa, which represents a realistic modulus of elasticity for a thermoplastic at typical embossing temperatures.

The plots shown in FIG. 15 demonstrate that for $E/p_{atm}$=10, the presence of trapped air has at most a 10% impact on the filling of narrow cavities with w/s=0.2. However, in the case of much wider cavities separated by only narrow ridges on the stamp (w/s=0.8), trapped air would reduce by as much as 30% of the proportion of the cavity volume filled with polymer for a given applied load. Since these simulations neglect the possibility that air diffuses from the cavity into the polymer, they offer an upper-bound estimate of the impact of air in a stamp cavity.

Figures 1, 16A:
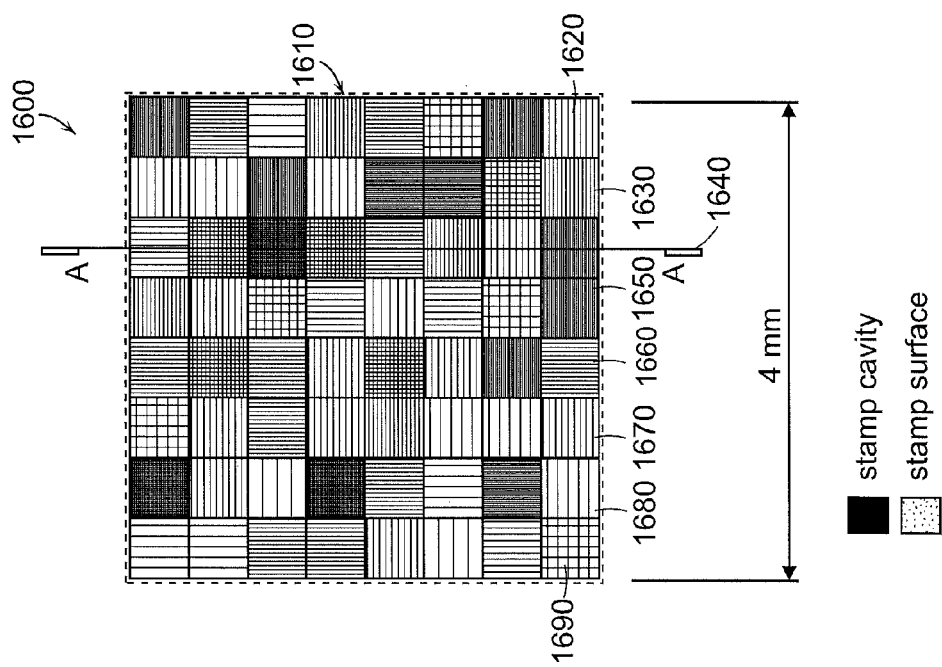
FIG. 16a illustrates a quasi-periodic test-stamp pattern used for verifying the validity of the linear Kelvin-Voigt according to an example embodiment of the present invention.
Figure 16A:
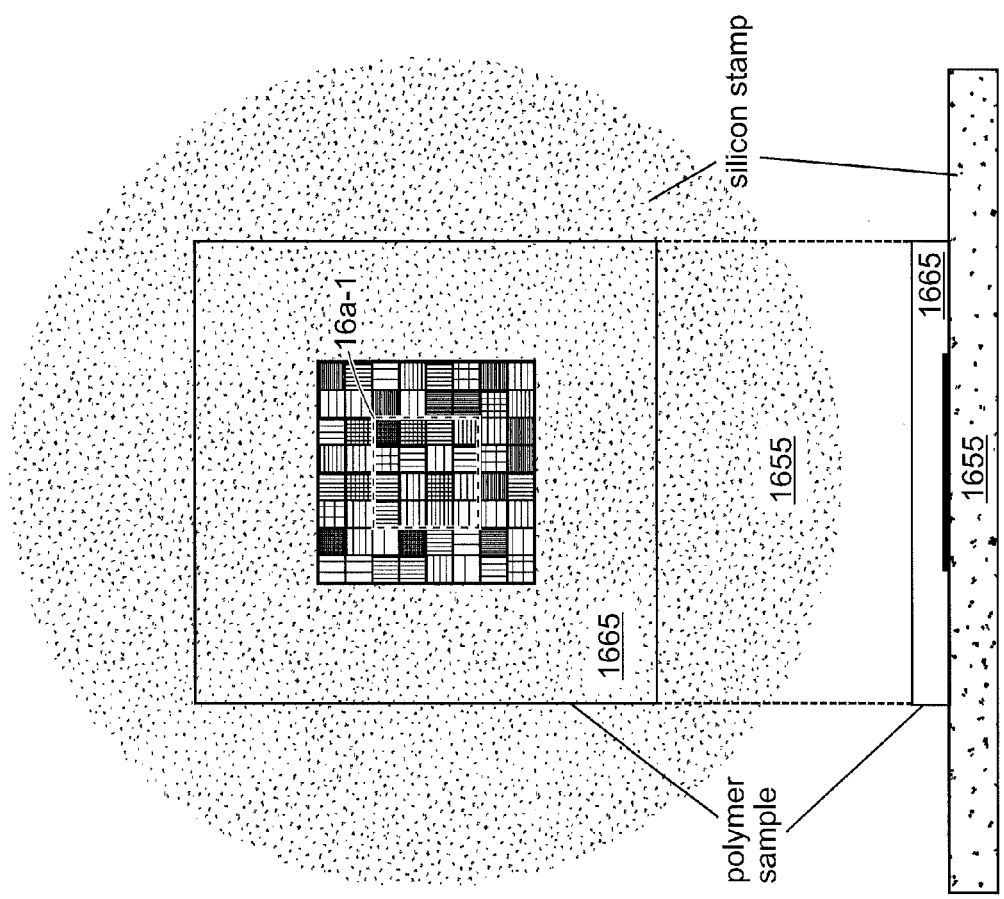

FIGS. 16a and 16a-1 illustrate a quasi-periodic test-stamp pattern used for verifying the validity of the linear Kelvin-Voigt according to an example embodiment of the present invention 1600. To check the validity of the linear Kelvin-Voigt model, samples of three polymers commonly used in hot micro-embossing: PMMA (McMaster Carr), PC (McMaster Can), and Zeonor 1060R (as a gift from Zeon Chemicals L.P., Louisville, Ky.) are used.

Each stamp carries a 3-by-3 array of identical patterned regions 1610 (shown in FIG. 16a-1), each patterned region 1610 containing an 8-by-8 patchwork of features 1620-1690, where each patch 1620-1690 is uniformly patterned with rectangular trenches or square holes of a particular diameter and pitch. The pitches used are 25, 50 and 100 μm, and cavity diameters range from 5 to 90 μm. For each pitch/width combination, there are two sets of trenches patterned on the stamp, with one set oriented perpendicularly to the other. The arrangement of the 64 patches is randomly chosen. Test stamps 1655 are fabricated in silicon using deep reactive ion etching to a depth of 20 μm or in some cases 30 μm. The etch-mask is a 1 μm-thick layer of OCG 825 photoresist, which is removed after etching with a 30-minute oxygen plasma exposure followed by immersion in a 'piranha' solution.

Samples of each of the polymers 1665 are embossed using a similar method as that illustrated in FIG. 1. An Instron (Norwood, Mass.) 5869 load-frame 130 is fitted with custom platens through which Paratherm (West Conshohocken, Pa.) type MR (MR fluid such as Paratherm MR is used in applications such as plastic molding and tooling) heat-transfer fluid is pumped at the desired temperature (37). Platen temperatures are monitored using thermocouples buried approximately 1 mm beneath the platen surfaces.

FIG. 16b is a table that includes the embossing conditions and experimental sequence used for each polymeric material. The term "Seq" 1601 indicates the order in which experiments are performed, with experiments for each material numbered separately ($p_0$ 1602 is the nominal sample-average pressure applied in MPa).

PMMA samples are unloaded at 90° C., PC samples at 115° C. and Zeonor 1060R samples at 70° C. Heating and cooling times with this apparatus are approximately 1-2 minutes. Applied sample-average pressures are selected to be low enough that not all features on the stamp were filled with polymer, allowing material properties to be extracted from the resulting sample topographies.

The embossed polymer samples 1665 are 25 mm square and approximately 1.5 mm thick, and therefore extended beyond the patterned region of the stamp 1655. Outside the patterned region, the flat surface of the silicon stamp 1655 pressed against the polymer 1665. An initial simulation is constructed to represent the full size of the embossed sample, including the central patterned region and a featureless border. It is established from this simulation that the average contact pressure within the central patterned region of the stamp is less than 0.5% lower than the global average pressure applied across the sample. It is therefore reasonable to perform further simulations for only the central 4 mm square patterned region of the stamp, assuming the average pressure across this smaller region to equal the sample-average pressure.

The topographies of the embossed samples are measured with a Zygo (Middlefield, Conn.) NewView white-light interferometer. The interferometer is programmed to assemble a map of the central 4 mm-square patterned region of each sample. These topographical maps are processed using custom-written routines that extracted the peak height, $z_{pk}$, of material penetrating a representative feature near the center of each of the 64 differently patterned regions.

Figures 16C, 17:
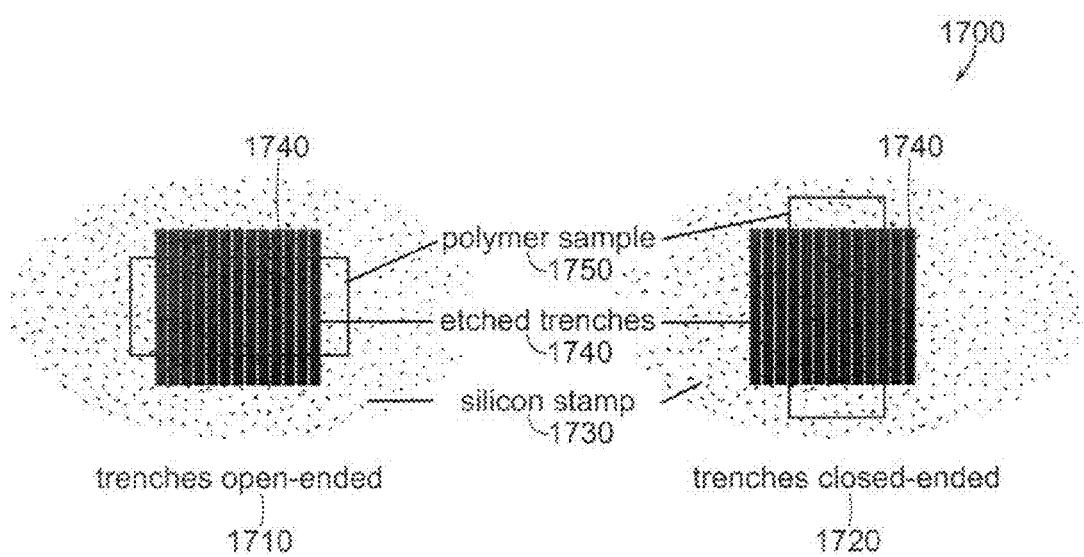
FIG. 16c is a table that includes viscoelastic parameters fit for three common hot embossing materials, and root-mean-square (r.m.s) fitting errors across all experimental measurements per material.
FIG. 17 illustrates the setup used for testing the impact of trapped air in cavities.

FIG. 16c is a table that includes viscoelastic parameters fit for three common hot embossing materials, and root mean square (r.m.s) fitting errors across all experimental measurements per material.

FIG. 17 illustrates the setup 1700 used for testing the impact of trapped air in cavities. As shown in FIG. 17, polymer samples 1750 may be embossed by silicon stamps 1730 carrying an array of identical patterned regions 1740 including patchworks of features. Each patch is uniformly patterned with rectangular trenches. These trenches may be open-ended 1710 or close-ended 1720. An alternative experimental approach may use only the close-ended configuration 1720 but with the sample 1750 perforated in selected locations to expose a subset of the trenches to the atmosphere, thereby allowing a comparison of the behavior of material in stamp cavities containing compressed air with that in stamp cavities at atmospheric pressure.

EXPERIMENTS

Figure 18:
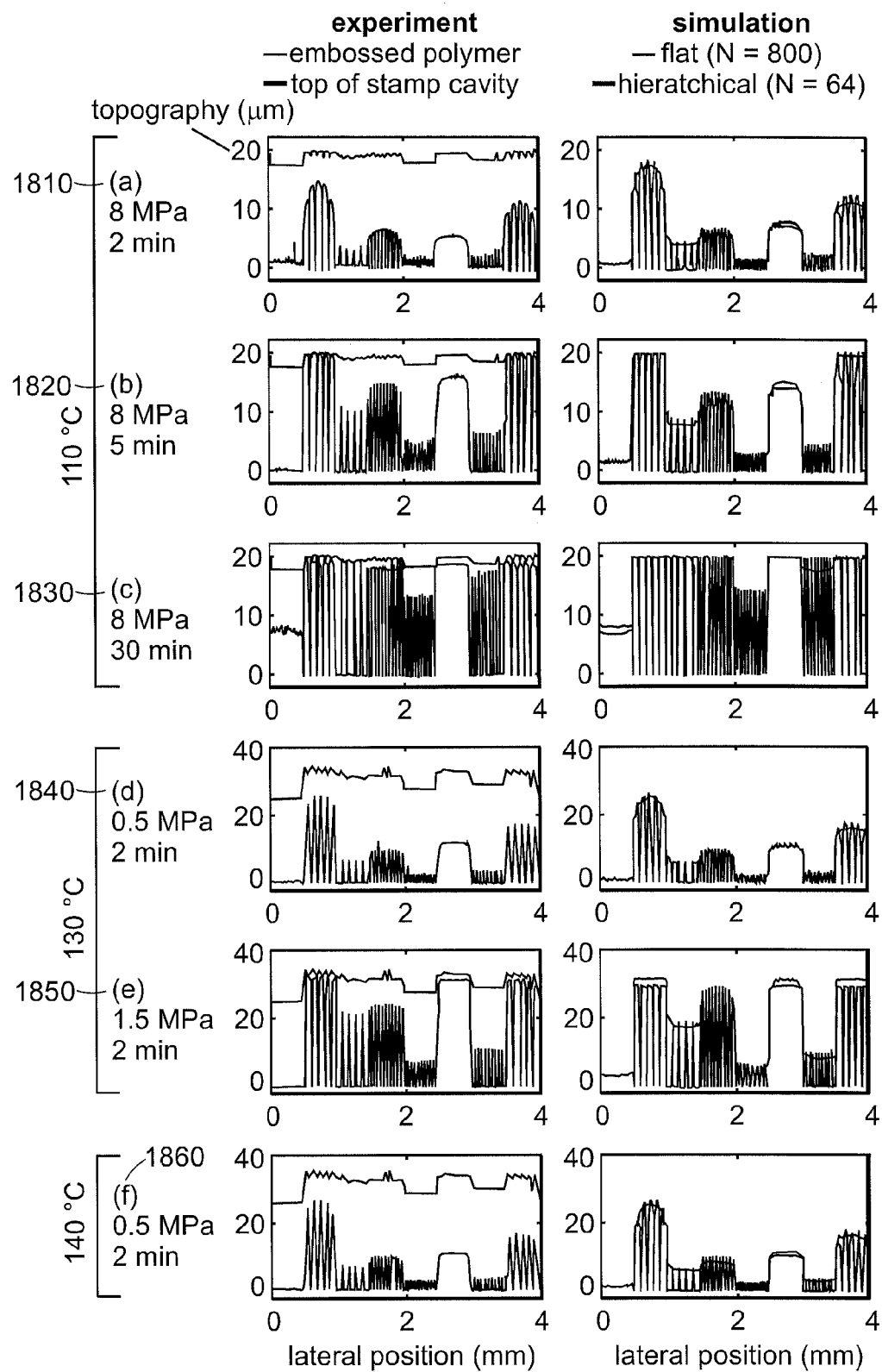
FIG. 18 illustrates measured and simulated topographies for polymethylmethacrylate (PMMA).

FIG. 18 illustrates measured and simulated topographies for PMMA. Plots labeled as (a)-(c) 1810,1820,1830 demonstrate embossing at 110° C. and 8 MPa sample-average pressure with loading durations of 2, 5 and 30 minutes. Plots labeled as (d)-(e) 1840,1850, 1860 illustrate embossing at 130° C. for 2 minutes with sample-average pressures of 0.5 and 1.5 MPa. Plot labeled as (f) 1860 illustrates embossing at 140° C. for 2 minutes with sample-average pressure of 0.5 MPa.

Figure 19:
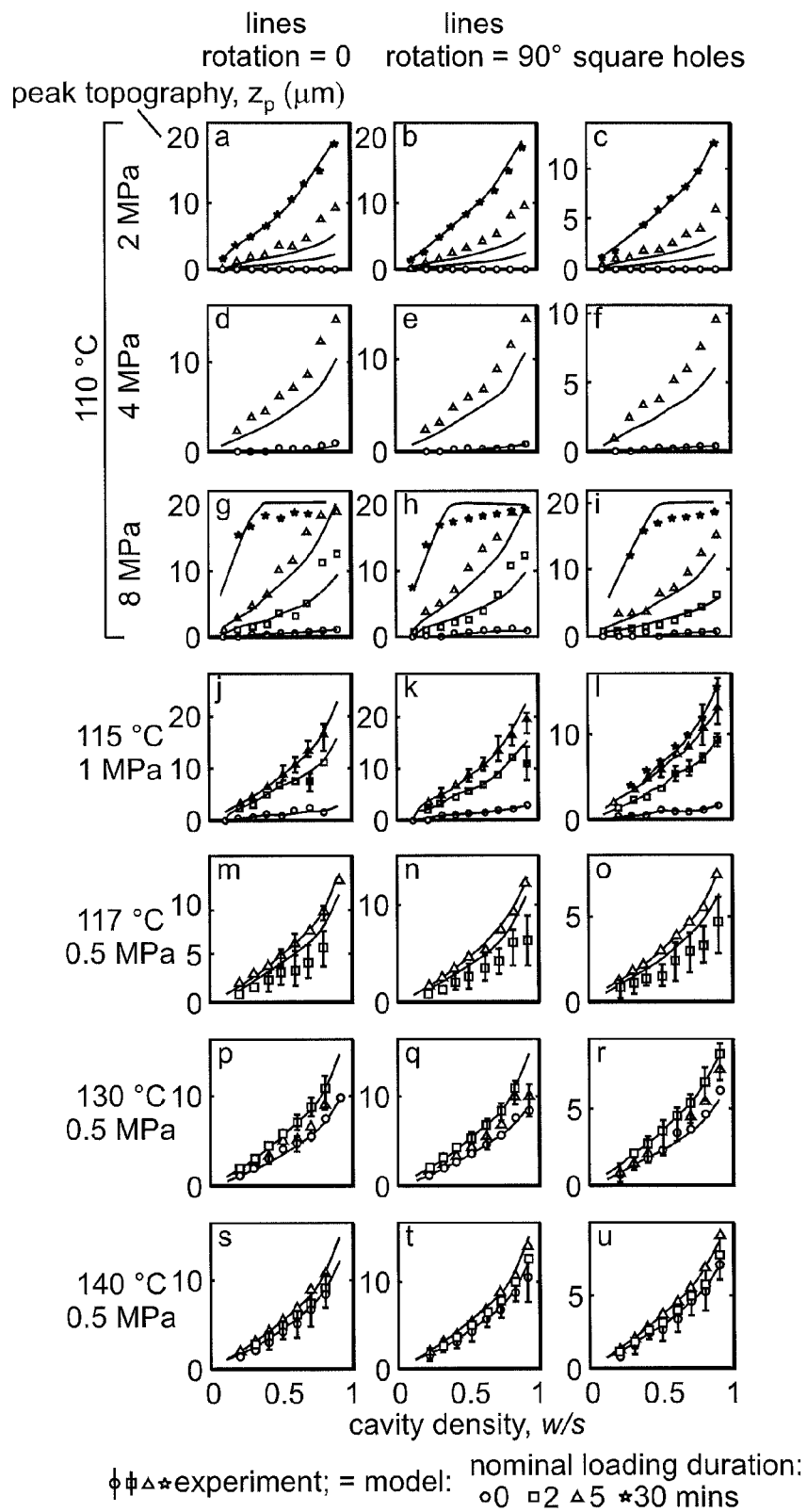
FIG. 19 illustrates cavity penetration depths for PMMA as a function of cavity opening density and nominal loading duration.

FIG. 19 illustrates cavity penetration depths, $z_p$, for PMMA as a function of cavity opening density, w/s, and nominal loading duration for 50-μm-pitch cavities. For temperatures of 115° C. and above, two samples were processed at each set of conditions. In these cases the mean value of $z_p$ is plotted and error bars represent the ranges of the results.

Figure 20:
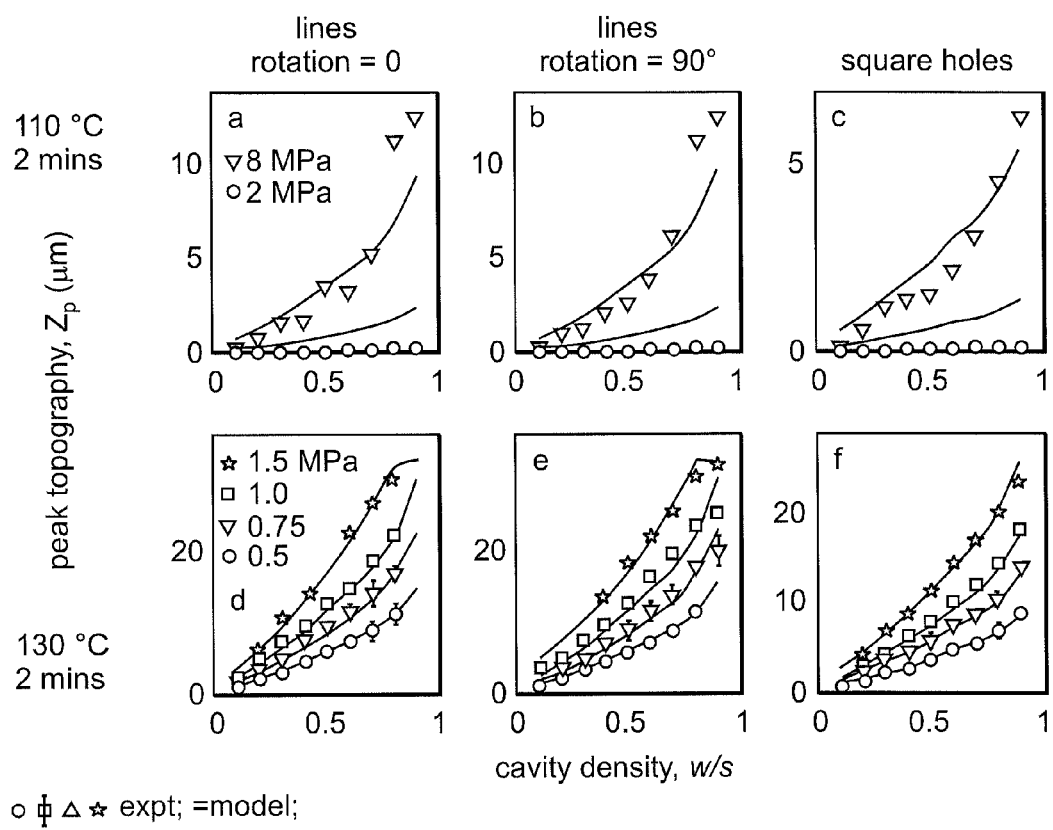
FIG. 20 illustrates cavity penetration depths for PMMA as a function of cavity opening density and sample-average pressure.

FIG. 20 illustrates cavity penetration depths, $z_p$, for PMMA as a function of cavity opening density, w/s, and sample-average pressure, for 50-μm-pitch cavities and 2-minute nominal loading durations. For temperatures of 115° C. and above, two samples were processed at each set of conditions; in these cases the mean value of $z_p$ is plotted and error bars represent the ranges of the results.

Figure 21:
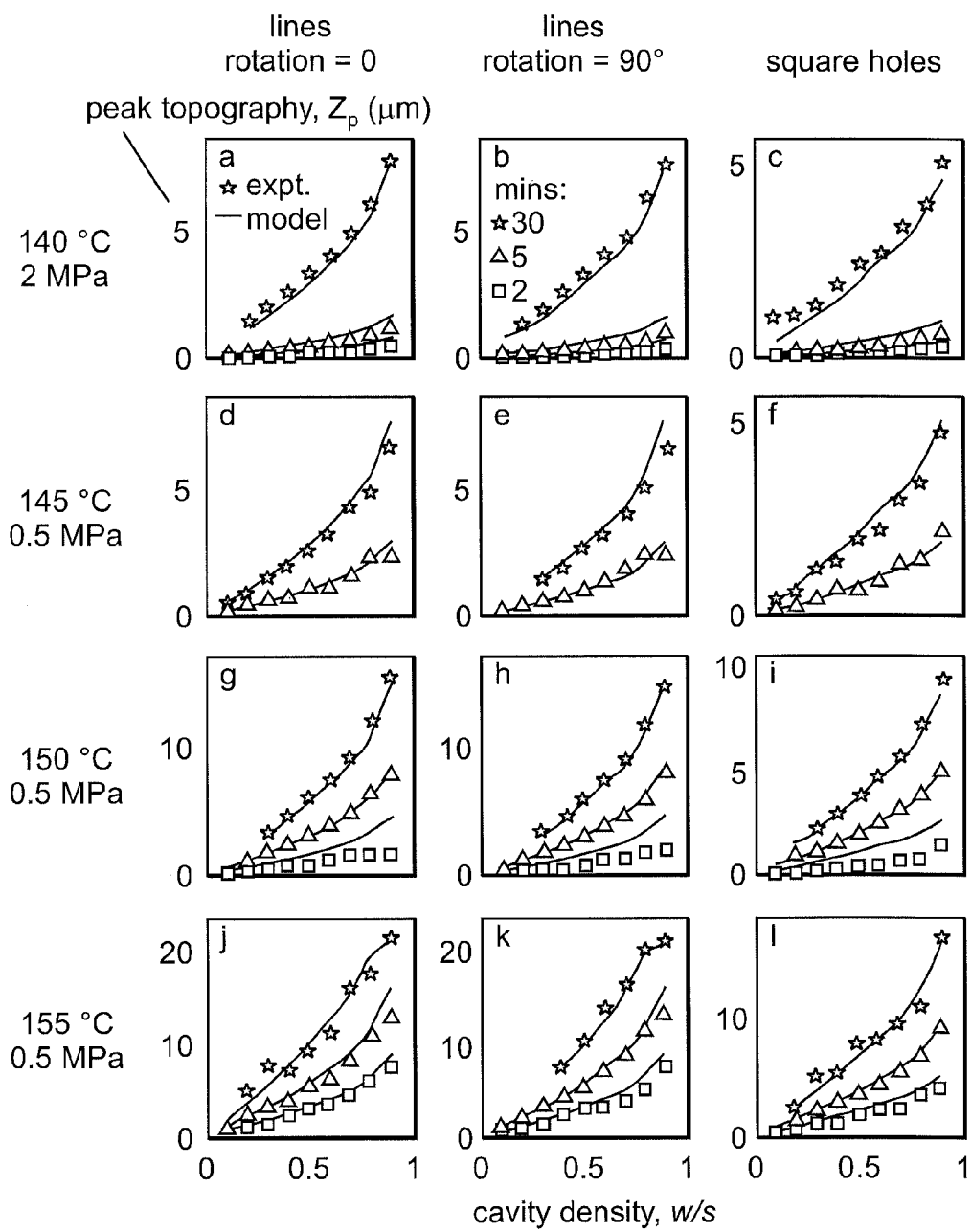
FIG. 21 illustrates cavity penetration depths for Polycarbonate (PC) as a function of cavity opening density and nominal loading duration.

FIG. 21 illustrates cavity penetration depths, $z_p$, for polycarbonate PC as a function of cavity opening density, w/s, and nominal loading duration, for 50-μm-pitch cavities.

Figure 22:
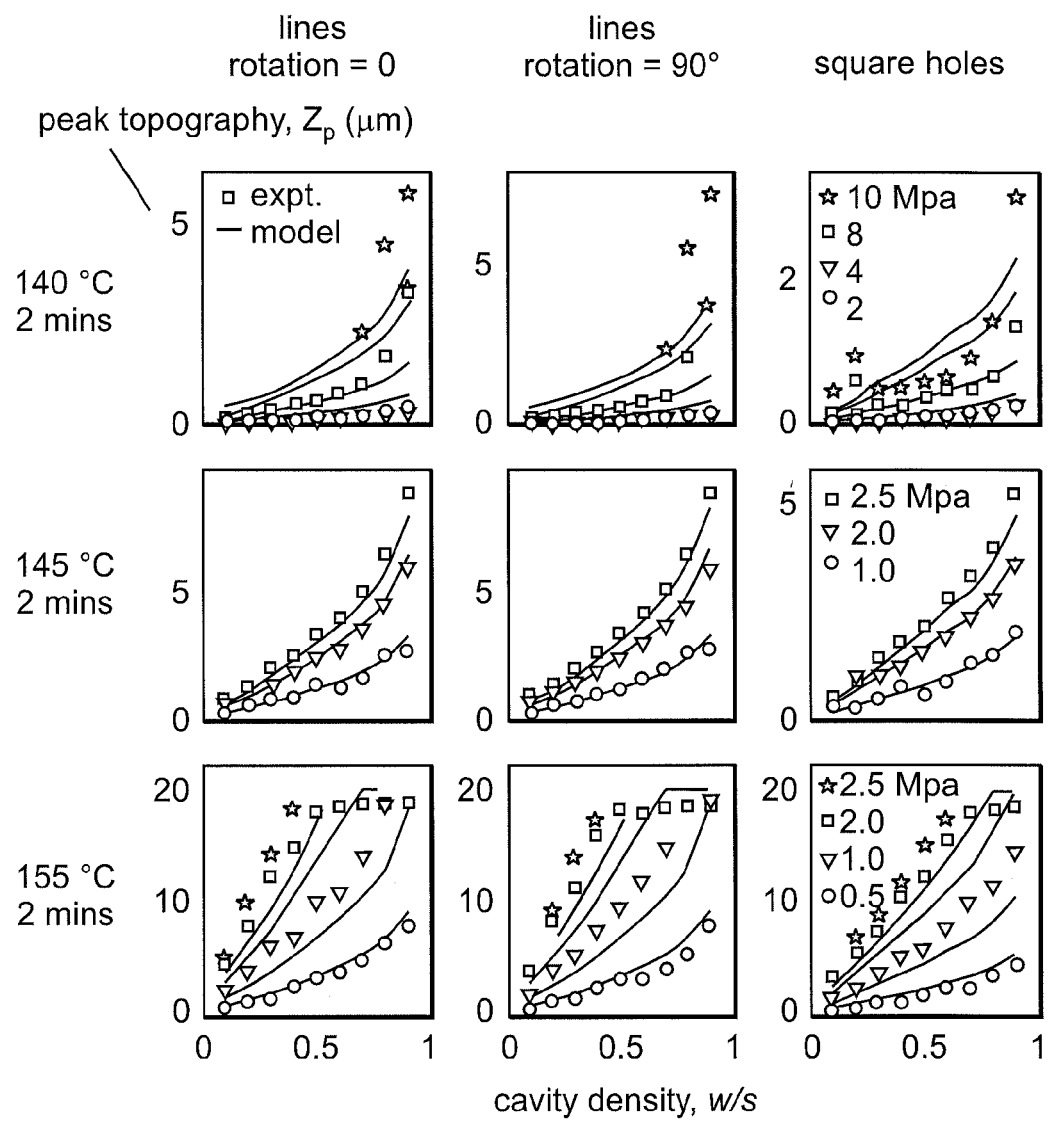
FIG. 22 illustrates cavity penetration depths for PC as a function of cavity opening density and sample-average pressure.

FIG. 22 illustrates cavity penetration depths, $z_p$, for PC as a function of cavity opening density, w/s, and sample-average pressure, for 50-μm-pitch cavities and 2-minute nominal loading durations.

Figure 23:
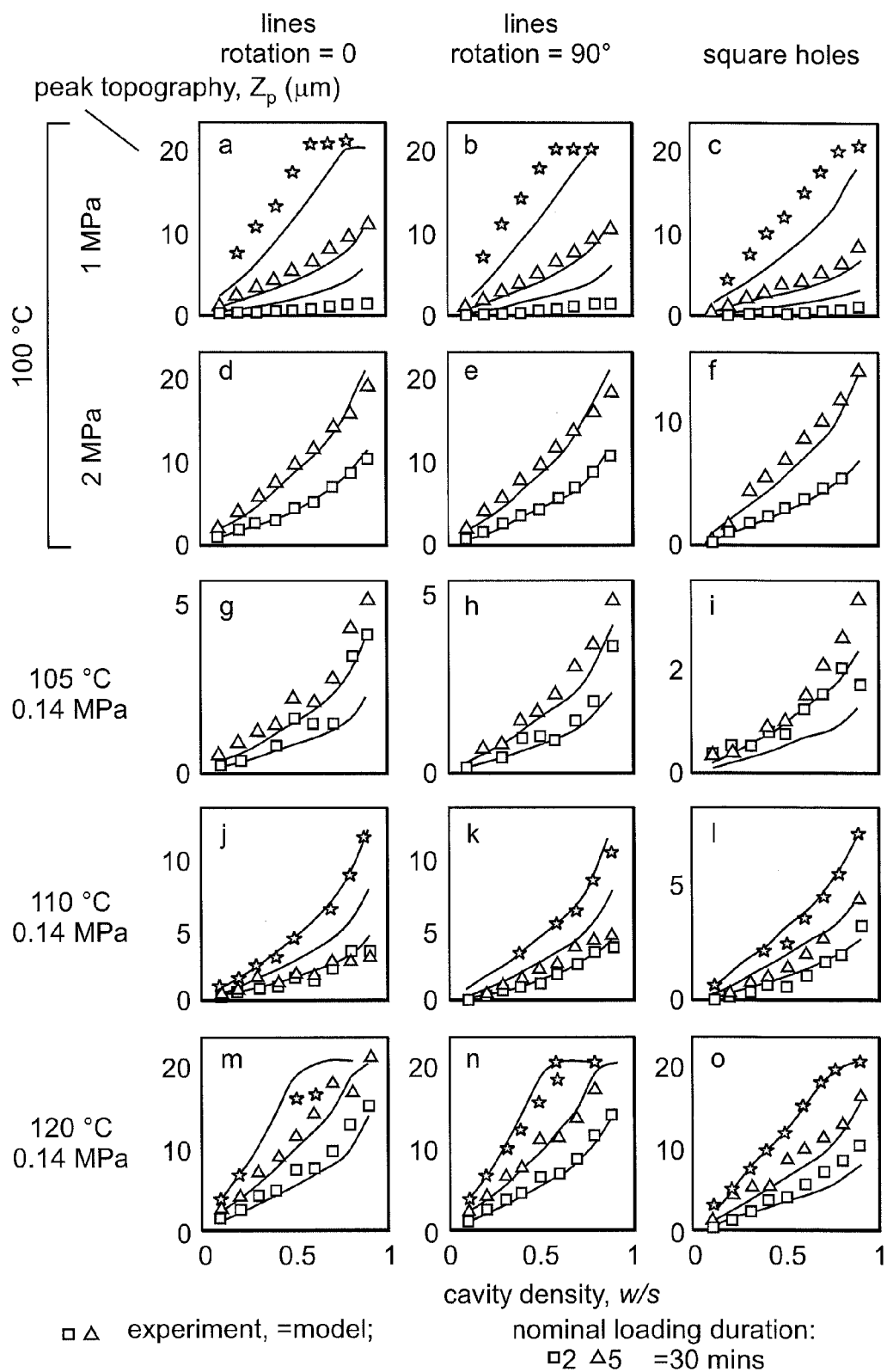
FIG. 23 cavity penetration depths for Zeonor 1060R as a function of cavity opening density and nominal loading duration.

FIG. 23 illustrate cavity penetration depths, $z_p$, for Zeonor 1060R as a function of cavity opening density, w/s, and nominal loading duration, for 50-μm-pitch cavities.

Figure 24:
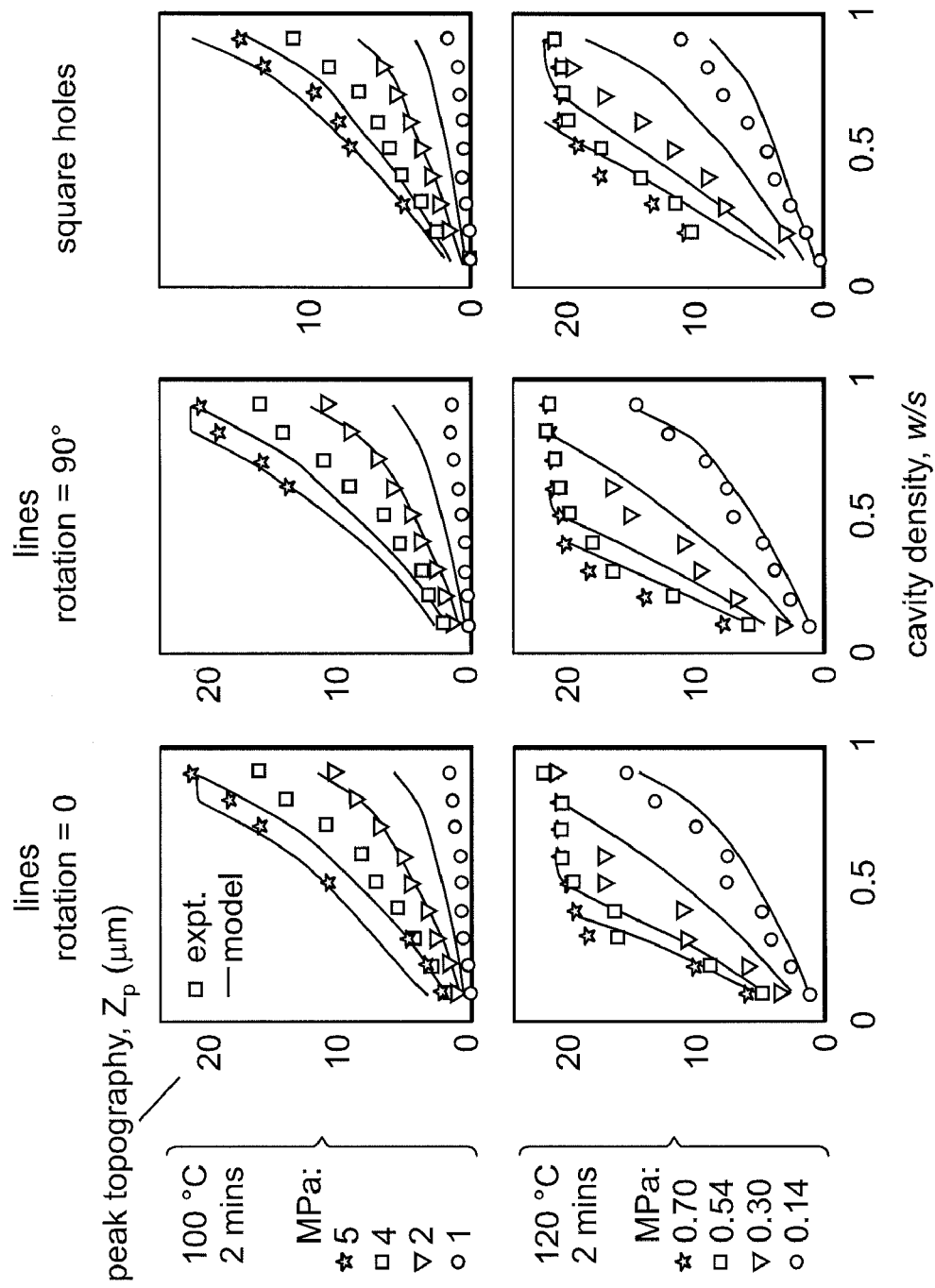
FIG. 24 illustrates cavity penetration depths for Zeonor 1060R as a function of cavity opening density and sample-average pressure.

FIG. 24 illustrate cavity penetration depths, $z_p$, for Zeonor 1060R as a function of cavity opening density, w/s, and sample-average pressure, for 50-μm-pitch cavities and 2-minute nominal loading durations.

FIGS. 18-24 illustrate the results of fitting the linear viscoelastic model to experimental data. The fitting procedure for each material involves three steps. The first step is to consider only the peak penetration data, $z_p$, for the longest loading duration at each temperature tested. It is temporarily assumed that at these long loading durations the topography have almost reached the limiting shape set by the elastic modulus of the material. Estimates are thus made for the parameters governing E(T). The second step is to look at the experimental results for two-minute nominal loading durations. These data, in combination with the estimates for E(T) from the first step, allows the parameters governing η(T) to be estimated. Thirdly, all parameter estimates are refined simultaneously using a residual least-squares minimization routine that considered all experimental data.

In these experiments, the ramp-up time of the load was 10 seconds and the cooling time at the end of each test is several tens of seconds, such that the nominal loading duration understates the actual length of time for which each sample experienced a load while above its glass transition temperature. Indeed, even samples with a nominal loading duration of zero exhibited a measurable topography. A further fitting parameter, $t_{delay}$, is therefore introduced. It is a delay term approximately representing this additional time under load and above $T_g$. The full nominal embossing load was modeled as being applied for the nominal loading duration plus $t_{delay}$.

Figure 25:
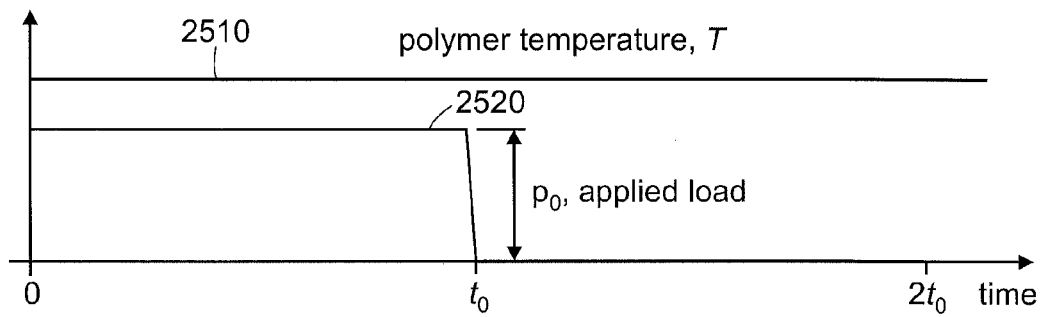
FIG. 25 illustrates the effects of soaking previously embossed PMMA components at the embossing temperature with no applied load.

FIG. 25 illustrates the effects of soaking previously embossed PMMA components at the embossing temperature 2510 but with no applied load 2520.

Figure 26:
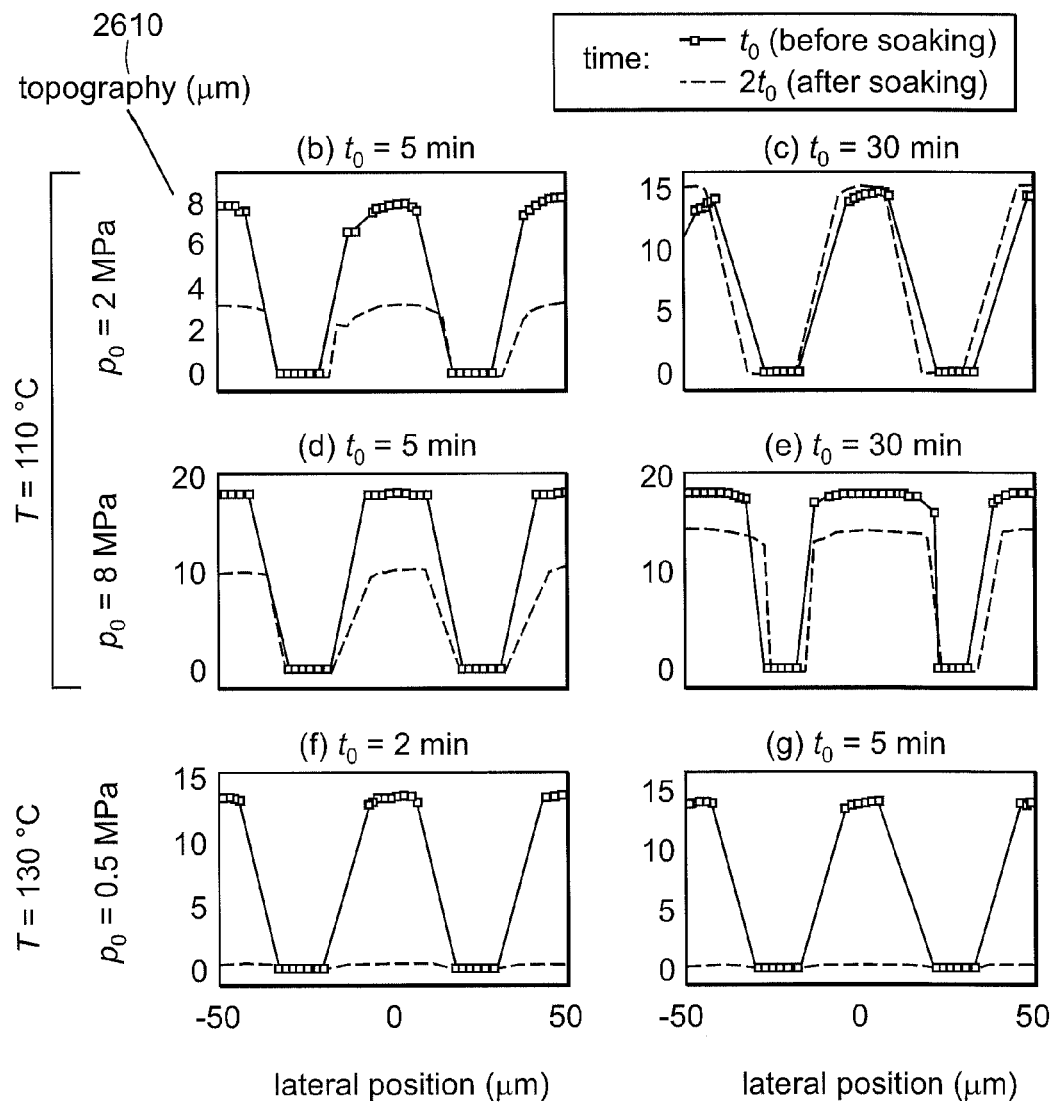
FIG. 26 illustrates the measured topographies of embossed ridges.

FIG. 26 illustrates the measured topographies 2610 of embossed ridges (s=50 μm; w/s=0.5) for samples both before and after soaking. At 130° C., embossed patterns almost completely disappear when soaked for 2 or 5 minutes. At 110° C., the degree of shape disappearance is markedly less than predicted by a linear viscoelastic model using the parameters fit.

Figures 27, 28:
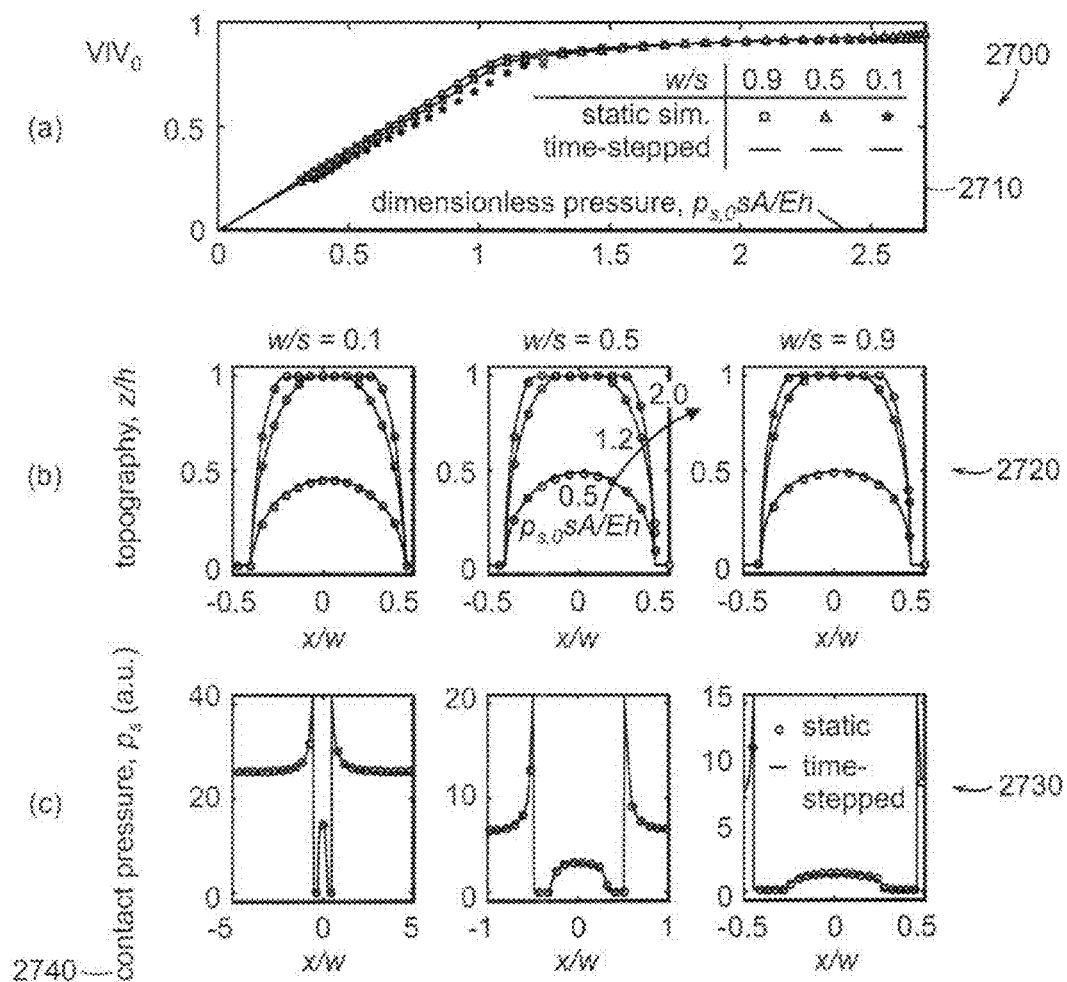
FIG. 27 includes plots that illustrate numerical simulations used to verify the validity of a static simulation.
FIG. 28 is a table that includes a summary of computation times for a test pattern.

FIG. 27 includes plots 2700 that illustrate numerical simulations used to verify the validity of a static simulation. These simulations employ an elastic 'virtual' substrate in a case where the true stamp (i.e., substrate contact-set) changes over time. A single-step static simulation of the filling of an array of long trenches is compared with a time-stepped visco-elastic simulation. Equivalence of the following two simulation schemes is demonstrated: (a) Rigid-body stamp displacements as a function of time 2710; (b) comparison of simulated topographies 2720; (c) the pressure distribution found in the one-step simulation using an elastic virtual substrate 2730. The pressure distribution 2730 is plotted together with an exponentially-weighted time-average, $p_s(x,y,t)$ 2740, of the evolving pressure distribution p(x,y,t) found in the time-stepped simulation. Here, $p_{s,0}$sA/Eh=2, which verifies the expression for $p_s(x,y,t)$.

FIG. 28 is a table that includes a summary of computation times for test pattern. Elements marked with a "*" indicate that the simulation was stopped when 10 iterations on the contact set had been completed.

Figure 29:
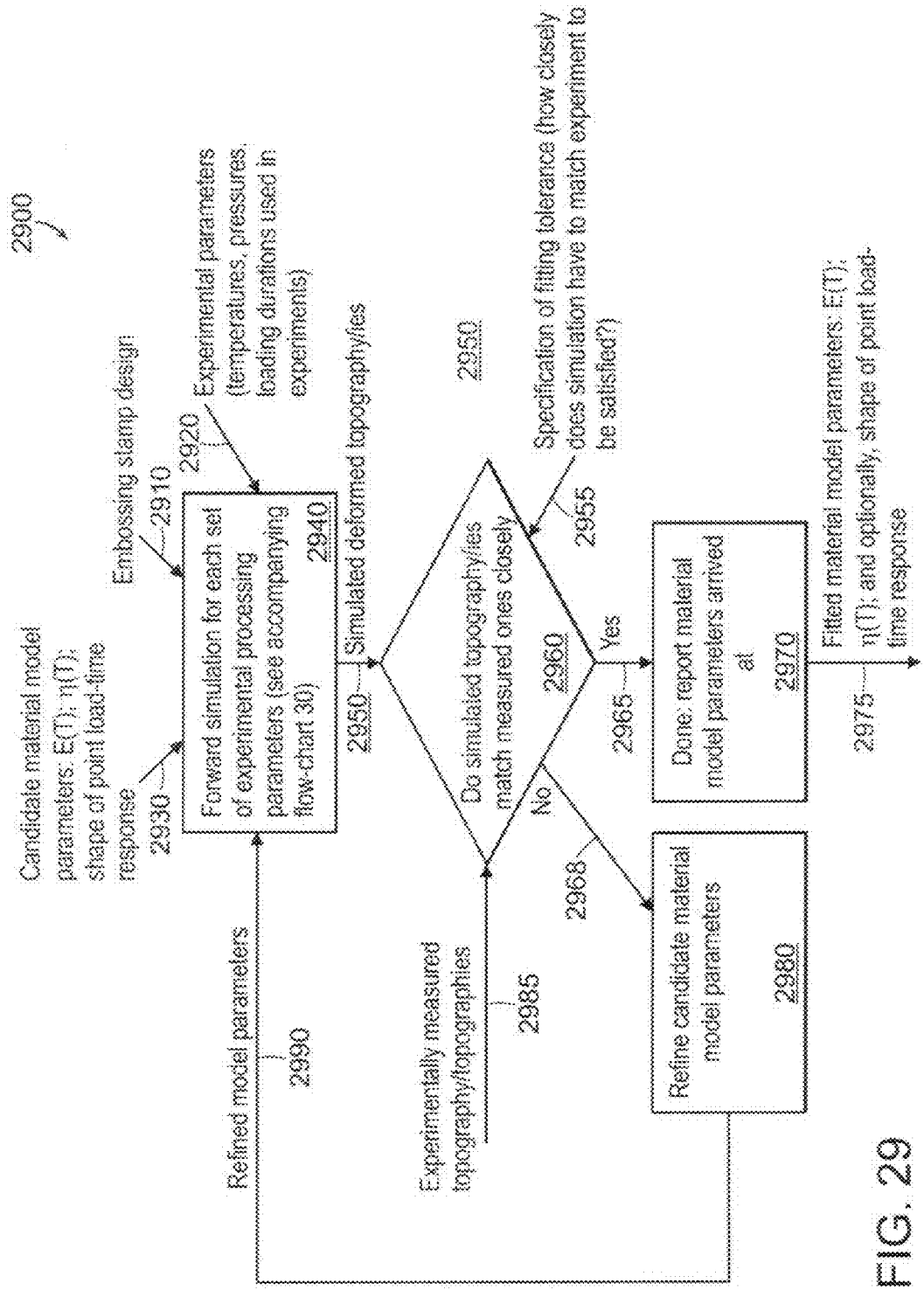
FIG. 29 is high-level illustration of an example embodiment of the present invention for modeling deformation of a deformable body embossed with a stamp.

FIG. 29 demonstrates an example embodiment 2900 of the present invention 2900 for iterative fitting of material parameters of deformable body. The example embodiment 2900 employs embossing stamp design 2910, experimental parameters 2920 (such as temperatures, pressures, loading durations used in experiments), and candidate material model parameters 2930 (such as E(T), η(T), shape of point load-time response 2975) to obtain simulated deformed topography (or topographies) of a deformed body 2950. The example embodiment 2900 employs forward simulation for each set of experimental processing parameters (shown later in FIG. 30) 2940.

The example embodiment 2900 determines if the simulated topographies match measured topographies closely 2960. If so 2965, the example embodiment 2900 reports the obtained material model parameters 2970. If the example embodiment 2900 determines that the simulated topographies do not match measured topographies closely 2968, the example embodiment 2900 refines candidate material model parameters 2980 and forwards the refined model parameters 2990 for so that forward simulations can be repeated 2940. In determining whether or not the simulated topographies match measured topographies closely 2960, the example embodiment 2900 may consider other factors such as specification of fitting tolerance 2955 (i.e., how closely does the simulation have to match the experiment to be satisfied), and experimentally measured topography (or topographies) 2985.

Figure 30:
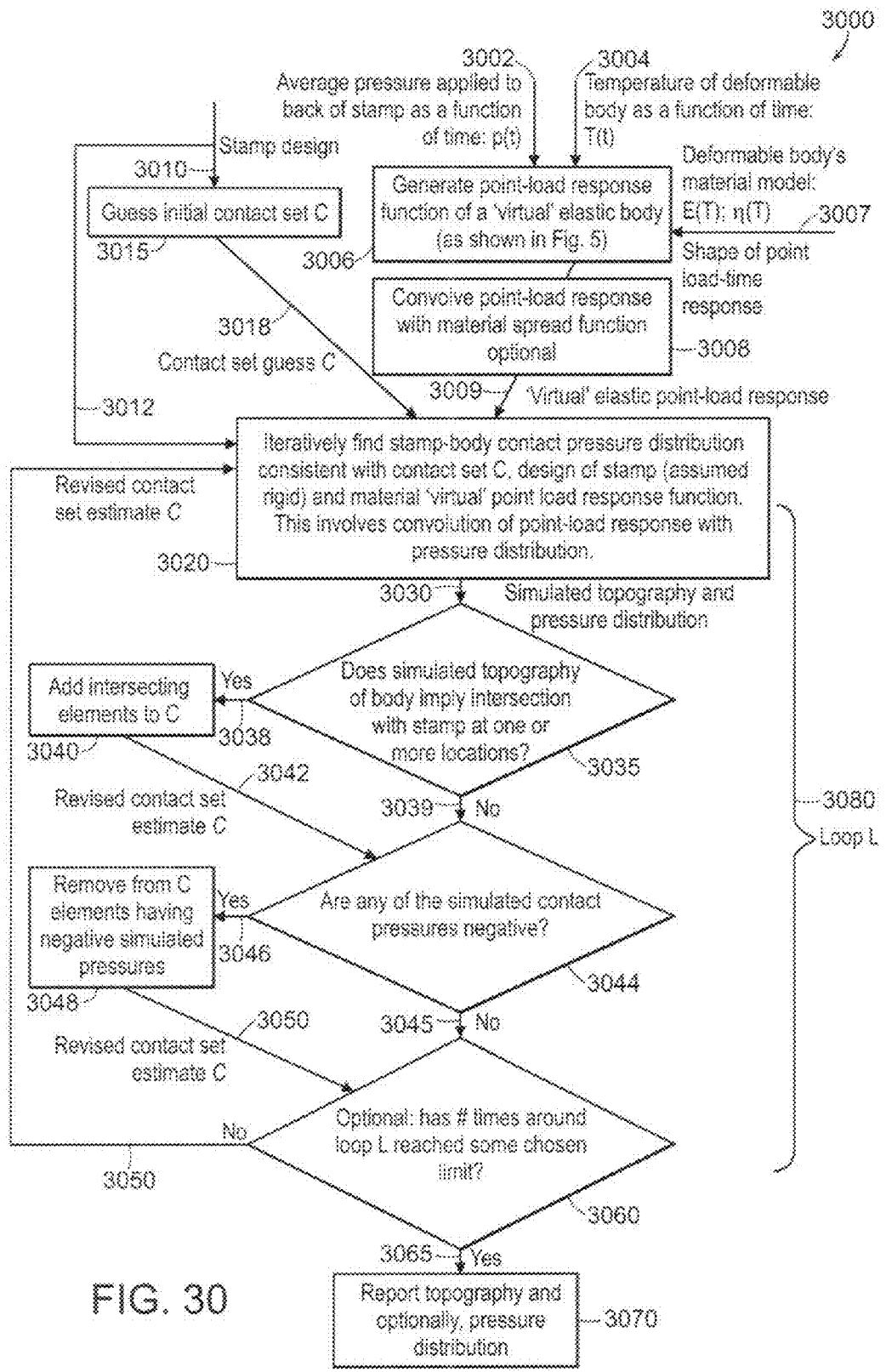
FIG. 30 is high-level illustration of an example embodiment of the present invention for determining a displacement of material in an embossed substrate.

FIG. 30 is a high level flow chart of the forward simulation procedures according to an example embodiment 3000 of the present invention 3000. The example embodiment 3000 generates point load response function of a virtual elastic body 3006 based on the average pressure applied to back of stamp 3002, temperature of deformable body as a function of time 3004, and the material model of the deformable body as well as the shape of point load-time response 3007. The example embodiment optionally (for thin deformable layers) may convolve the point load-time response with material spread function 3008.

The example embodiment 3000 employs the stamp design 3010 and sets an initial guess for contact set C 3015. The example embodiment 3000 employs the virtual elastic point load response 3009, the stamp design 3012, and the contact set guess 3018 to iteratively find the stamp body contact pressure distribution that is consistent with contact set C, design of stamp (assumed rigid), and material virtual point load response function. This involves convolution of point load response with pressure distribution 3020.

The example embodiment 3000 employs the simulated topography and pressure distribution 3030 to determine whether the simulated topography of the deformable body implies intersection with stamp at one or more locations 3035. If so 3038, the example embodiment 3000 adds intersecting elements to C 3040 and employs the revises contact set estimate C 3042 to determine if any of the simulated contact pressures are negative 3044. If the simulated topography of the deformable body does not imply intersection with stamp at one or more locations 3039, the example embodiment 3000 proceeds to determine if any of the simulated contact pressures are negative 3044. If so 3046, the example embodiment 3000 removes from C elements having negative simulated pressures 3048 and revises contact set estimate C 3050. If not 3045, the example embodiment 3000 optionally may determine if the number of iterations around the loop L 3080 has reached a predetermined number 3060. If not 3068, the example embodiment 3068 repeats the loop L 3080 using the revised contact set estimate C 3050. If the number of iterations around the loop L 3080 has reached a predetermined number 3065, the example embodiment reports topography and optionally pressure distribution 3070.

Figure 31:
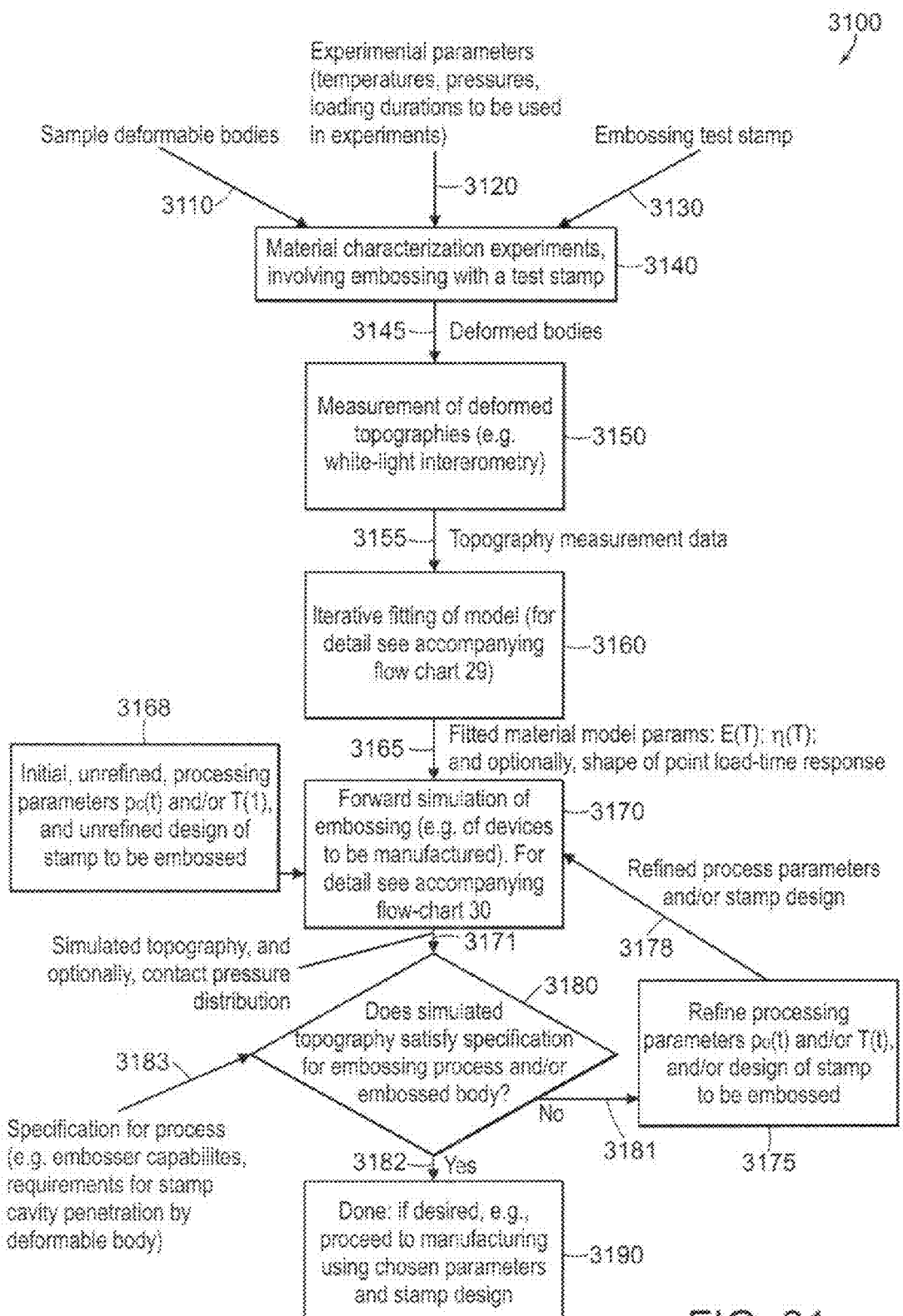
FIG. 31 is a flow chart of an example embodiment of the present invention for determining a displacement of a material in a thermoplastic embossed with a stamp.

FIG. 31 is a flow chart of an example embodiment 3100 of the present invention. The example embodiment 3100 employs Sample deformable bodies 3110, experimental parameters (such as temperatures, pressures, loading durations to be used in experiments) 3120, and embossing test stamp 3130 to deform deformable bodies and perform material characterization experiments, involving embossing with a test stamp 3140.

The example embodiment 3100 employs the deformed bodies 3145 to obtain measurement of deformed topographies (e.g. using white-light interferometry) 3150. The example embodiment 3100 employs the topography measurement data 3155 for iterative fitting of model (shown in FIG. 29) 3160. The example embodiment 3100 employs the fitted material model parameters 3165 such as $E(T)$, $\eta(T)$, and optionally shape of point load-time response are in forward simulation of embossing (e.g. of devices to be manufactured) 3170 and verifies if simulated topography 3171 satisfy specification for embossing process and/or embossed body 3180 (specification for process (e.g. embosser capabilities, requirements for stamp cavity penetration by deformable body 3183 may also be considered in this decision making process). If so 3182, the example embodiment 3100 proceeds to manufacturing 3190 using chosen parameters and stamp design. If not 3181, refines 3175 processing parameters $p_0(t)$ and/or $T(t)$, and/or design of stamp to be embossed 3178 and repeats the forward simulation of embossing 3170.

The example embodiment 3100 may also employs initial, unrefined, processing parameters $p_0(t)$ and/or $T(t)$, and unrefined design of stamp to be embossed 3168 in the forward simulation of embossing 3170.

It should be understood that procedures, such as those illustrated by flow diagram or block diagram herein or otherwise described herein, may be implemented in the form of hardware, firmware, or software, executed in any device such as a general purpose computer or an application specific computer. If implemented in software, the software may be implemented in any software language consistent with the teachings herein and may be stored on any computer-readable medium known or later developed in the art. The software, typically, in form of instructions, can be coded and executed by a processor in a manner understood in the art.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of embossing a deformable body with a stamp, the method comprising:
   running a deformation model determined as a function of convolving a point-load-time response and a contact pressure distribution, the contact pressure distribution being generated as a function of determining a distribution at which the stamp remains rigid while the deformable body deforms; and
   embossing the deformable body as a function of the deformation model.

2. The method of claim 1 further including generating the point-load-time response as a function of at least one of: determining a time-dependent response of a surface of the deformable body to system inputs applied to an elemental region of the surface of the deformable body or a distance from a loading position.

3. The method of claim 1 further including generating an estimate of the contact pressure distribution as a function of the point-load-time response and an average pressure applied to the stamp.

4. The method of claim 1 wherein the contact pressure distribution is periodic in space.

5. The method of claim 1 further including generating the contact pressure distribution in part as a function of air trapped within one or more cavities on the stamp.

6. The method of claim 1 wherein the deformable body includes at least one of: one or more polymeric layers arranged to be thicker in dimensions than dimensions of features being embossed or one or more polymeric layers arranged to be comparable in thickness than thickness of features being embossed.

7. The method of claim 1 wherein the deformable body comprises one or more thermoplastic layers.

8. The method of claim 1 further including determining a displacement of material in the deformable body embossed with the stamp and reporting the displacement for use in embossing of the deformable body.

9. The method of claim 1 further including determining one or more properties of the deformable body and determining a displacement of material in the deformable body embossed with the stamp as a function of the point-load-time response, the contact pressure distribution, and the one or more properties of the deformable body.

10. The method of claim 9 wherein the one or more properties of the deformable body includes at least one of time dependent properties, temperature dependent properties, temperature and time dependent properties, temperature dependent elasticity, or temperature dependent viscosity.

11. A system for embossing a deformable body, the system including:
a deformation module that provides a deformation model of the deformable body as a function of convolving a point-load-time response and a contact pressure distribution, the deformation module including a generator arranged to generate the contact pressure distribution as a function of determining a distribution at which a stamp remains rigid while the deformable body deforms; and
an embosser that embosses the deformable body as a function of the deformation model.

12. The system of claim 11 wherein the deformation module includes a first generation module arranged to generate the point-load-time response as a function of at least one of: determining a time-dependent response of a surface of the deformable body to system inputs applied to an elemental region of the surface of the deformable body or a distance from a loading position.

13. The system of claim 11 wherein the deformation module includes a second generation module to generate an estimate of the contact pressure distribution as a function of the point-load-time response and an average pressure applied to a stamp.

14. The system of claim 11 wherein the contact pressure distribution is periodic in space.

15. The system of claim 11 wherein the deformation module includes a second generation module arranged to generate the contact pressure distribution in part as a function of air trapped within one or more cavities on the stamp.

16. The system of claim 11 wherein the deformable body includes at least one of one or more polymeric layers arranged to be thicker in dimensions than dimensions of features being embossed or one or more polymeric layers arranged to be comparable in thickness than thickness of features being embossed.

17. The system of claim 11 wherein the deformable body comprises one or more thermoplastic layers.

18. The system of claim 11 wherein the deformation module includes a displacement determination module arranged to determine a displacement of material in the deformable body embossed with the stamp and wherein the reporting module reports the displacement for use in embossing of the deformable body.

19. The system of claim 11 further including a determination module arranged to determine one or more properties of the deformable body and a displacement determination module arranged to determine a displacement of material in the deformable body embossed with the stamp as a function of the point-load-time response, the contact pressure distribution, and the one or more properties of the deformable body.

20. The system of claim 11 wherein the one or more properties of the deformable body includes at least one of time dependent properties, temperature dependent properties, temperature and time dependent properties, temperature dependent elasticity, or temperature dependent viscosity.

21. A computer program product comprising a computer readable medium having computer readable code stored thereon, which, when executed by a processor, causes the processor to:
model a deformation as a function of convolving a point-load-time response and a contact pressure distribution, the contact pressure distribution being generated as a function of determining a distribution at which a stamp remains rigid while a deformable body deforms; and
report the deformation model for use in embossing of the deformable body using the stamp.

* * * * *